United States Patent
Wang et al.

(10) Patent No.: US 11,899,304 B2
(45) Date of Patent: Feb. 13, 2024

(54) LIQUID CRYSTAL DISPLAY PANEL AND DRIVING METHODS THEREFOR, AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Feifei Wang, Beijing (CN); Lintao Ji, Beijing (CN); Bowen Li, Beijing (CN); Hongming Zhan, Beijing (CN); Kaixuan Wang, Beijing (CN); Xibin Shao, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 3 days.

(21) Appl. No.: 17/781,302

(22) PCT Filed: Jun. 15, 2021

(86) PCT No.: PCT/CN2021/100176
§ 371 (c)(1),
(2) Date: May 31, 2022

(87) PCT Pub. No.: WO2022/068265
PCT Pub. Date: Apr. 7, 2022

(65) Prior Publication Data
US 2022/0413337 A1    Dec. 29, 2022

(30) Foreign Application Priority Data

Sep. 30, 2020 (CN) .......................... 202011057599.4

(51) Int. Cl.
*G02F 1/1335* (2006.01)
*G02F 1/1334* (2006.01)
(Continued)

(52) U.S. Cl.
CPC ...... *G02F 1/133531* (2021.01); *G02F 1/1334* (2013.01); *G02F 1/1391* (2013.01);
(Continued)

(58) Field of Classification Search
CPC ......... G02F 1/133531; G02F 1/134309; G02F 1/1334; G02F 1/1391; G02F 1/13363;
(Continued)

(56) References Cited

U.S. PATENT DOCUMENTS 6,507,381 B1    1/2003  Katsuya et al.
2002/0047973 A1    4/2002  Matsumoto
(Continued)

FOREIGN PATENT DOCUMENTS

CN    101551550 A    10/2009
CN    103901657 A    7/2014
(Continued)

OTHER PUBLICATIONS

Office Action for Chinese Patent Application No. 202011057599.4 issued by the Chinese Patent Office dated Dec. 8, 2022.
(Continued)

*Primary Examiner* — Hang Lin
(74) *Attorney, Agent, or Firm* — IP & T GROUP LLP

(57) ABSTRACT

A liquid crystal display panel (100) comprises a first polarizer (110) and a second polarizer (170), a first liquid crystal layer (130) disposed between the first polarizer (110) and the second polarizer (170), and an optical compensation layer (140) disposed between the first liquid crystal layer (130) and one of the first polarizer (110) and the second polarizer (170). A transmission axis of the first polarizer (110) is
(Continued)

perpendicular to a transmission axis of the second polarizer (170). The first liquid crystal layer (130) includes first liquid crystal molecules (130'). An included angle (γ) between an orthographic projection of an optical axis of a first liquid crystal molecule (130') on the first polarizer (110), which is perpendicular to an orthographic projection of an optical axis of the optical compensation layer (140) on the first polarizer (110), and the transmission axis of the first polarizer (110) is an acute angle.

19 Claims, 14 Drawing Sheets

(51) Int. Cl.
| | | |
|---|---|---|
| *G02F 1/13363* | (2006.01) | |
| *G02F 1/1343* | (2006.01) | |
| *G02F 1/139* | (2006.01) | |
| *G09G 3/36* | (2006.01) | |
| G02F 1/137 | (2006.01) | |
| G02F 1/1333 | (2006.01) | |
| G02F 1/1337 | (2006.01) | |

(52) U.S. Cl.
CPC .... *G02F 1/13363* (2013.01); *G02F 1/134309* (2013.01); *G09G 3/36* (2013.01); *G02F 1/1337* (2013.01); *G02F 1/13712* (2021.01); *G02F 1/13756* (2021.01); *G02F 1/133357* (2021.01); *G02F 2413/08* (2013.01); *G02F 2413/13* (2013.01)

(58) Field of Classification Search
CPC .......... G02F 1/133634; G02F 1/13471; G02F 1/13712; G02F 1/133357; G02F 1/133773; G02F 1/13756; G02F 1/1337; G09G 3/36; G09G 3/3629; G09G 2310/0237; G09G 2320/0238; G09G 2300/0486
See application file for complete search history.

(56) References Cited

U.S. PATENT DOCUMENTS

| | | | |
|---|---|---|---|
| 2006/0290854 A1* | 12/2006 | Hisatake | ........... G02F 1/133634 349/117 |
| 2012/0162581 A1* | 6/2012 | Ashida | ................. G02B 5/3016 349/96 |
| 2018/0052351 A1* | 2/2018 | Nakamura | ........ G02F 1/134363 |
| 2020/0142234 A1 | 5/2020 | Iwasaki et al. | |
| 2020/0371399 A1 | 11/2020 | Liu et al. | |

FOREIGN PATENT DOCUMENTS

| | | |
|---|---|---|
| CN | 104020615 A | 9/2014 |
| CN | 104898339 A | 9/2015 |
| CN | 107407838 A | 11/2017 |
| CN | 108303830 A | 7/2018 |
| CN | 207799298 U | 8/2018 |
| CN | 109445193 A | 3/2019 |
| CN | 110262098 A | 9/2019 |
| CN | 110945414 A | 3/2020 |
| CN | 112099270 A | 12/2020 |
| JP | H07261152 A | 10/1995 |
| JP | H07306417 A | 11/1995 |
| JP | H11160716 A | 6/1999 |
| JP | 2009103949 A | 5/2009 |
| JP | 2018-105908 A | 7/2018 |
| KR | 10-2005-0068171 A | 7/2005 |
| KR | 10-2015-0137367 A | 12/2015 |
| KR | 10-2016-0145383 A | 12/2016 |
| WO | 2014176850 A | 11/2014 |
| WO | 2021/092924 A1 | 5/2021 |

OTHER PUBLICATIONS

Office Action for Chinese Patent Application No. 202011057599.4 issued by the Chinese Patent Office dated May 12, 2023.

* cited by examiner

| Item | | Liquid crystal display panel 200 | Scheme 1 | Scheme 2 | Scheme 3 |
|---|---|---|---|---|---|
| Structural settings | Cell gap of the first liquid crystal layer / μm | 3.55 | 1.775 | 1.775 | 1.775 |
| | Optical compensation layer | - | 175 | 175 | 175 |
| | Second liquid crystal layer | - | 120 | 175 | 247 |
| Response time | Ton+Toff | 14 | 3.97 | 3.97 | 3.97 |
| | Change ratio | - | 71.66% | 71.66% | 71.66% |
| Transmittance | L0 | 0.000189 | 0.000232 | 0.000232 | 0.000232 |
| | L255 | 0.285936 | 0.224368 | 0.268052 | 0.288523 |
| | Change ratio | - | 21.53% | 6.25% | -0.90% |
| | Contrast ratio CR | 1509.34 | 967.05 | 1155.33 | 1243.56 |

| Item | | Liquid crystal display panel 200 | Scheme 4 | Scheme 5 |
|---|---|---|---|---|
| Structural settings | Cell gap of the first liquid crystal layer / μm | 3.55 | 1.775 | 1.775 |
| | Optical compensation layer | - | 175 | 175 |
| | Second liquid crystal layer | - | - | 247 |
| Response time | Ton+Toff | 14 | 3.97 | 3.97 |
| | Change ratio | - | 71.66% | 71.66% |
| Transmittance | L0 | 0.000189 | 0.000232014 | 0.000232 |
| | L255 | 0.285936 | 0.174941 | 0.288523 |
| | Change ratio | - | 38.82% | -0.90% |
| | Contrast ratio CR | 1509.34 | 754.01 | 1243.56 |

FIG. 11

Drive the liquid crystal display panel to display a black picture, and apply the first vertical electric field to the second liquid crystal layer through the first control electrode(s) and the second control electrode(s), so as to drive the optic axes of the second liquid crystal molecules in the second liquid crystal layer to be perpendicular to the first polarizer — S101

Drive the liquid crystal display panel to display a non-black picture, and withdraw the first vertical electric field, so that the orthogonal projections of the optic axes of the second liquid crystal molecules in the second liquid crystal layer on the first polarizer are parallel to the orthogonal projection of the optic axis of the optical compensation layer on the first polarizer — S102

FIG. 12

Drive a pixel in the liquid crystal display panel to display a black block, and apply the first vertical electric field to a portion of the second liquid crystal layer corresponding to the pixel through the first control electrode(s) and the second control electrode(s), so as to drive the optic axes of the second liquid crystal molecules in the portion to be perpendicular to the first polarizer ⟶ S201

Drive the pixel in the liquid crystal display panel to display a non-black block, and withdraw the first vertical electric field, so that the orthogonal projections of optical axes of the second liquid crystal molecules in the portion of the second liquid crystal layer corresponding to the pixel on the first polarizer are parallel to the orthogonal projection of the optical axis of the optical compensation layer on the first polarizer ⟶ S202

FIG. 13

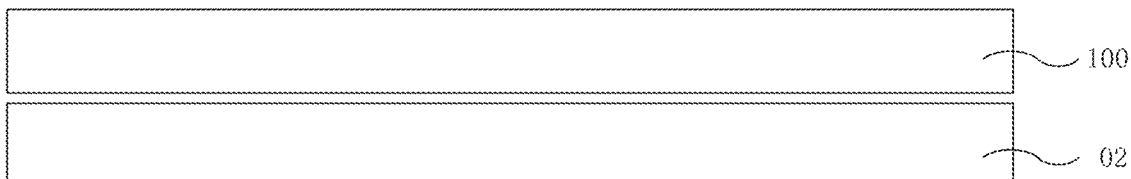

FIG. 14

LIQUID CRYSTAL DISPLAY PANEL AND DRIVING METHODS THEREFOR, AND DISPLAY APPARATUS

CROSS-REFERENCE TO RELATED APPLICATIONS

This application is a national phase entry under 35 USC 371 of International Patent Application No. PCT/CN2021/100176, filed on Jun. 15, 2021, which claims priority to Chinese Patent Application No. 202011057599.4, filed on Sep. 30, 2020, which are incorporated herein by reference in their entirety.

TECHNICAL HELD

The present disclosure relates to the field of display technologies, and in particular, to a liquid crystal display panel and a driving method therefor, and a display apparatus.

BACKGROUND

Liquid crystal display (LCD) apparatuses have been widely used in information technology, multimedia technology and other fields due to their advantages of lightness, thin thickness, low power consumption and low radiation, and have gradually become a mainstream of various display apparatuses. With the development of display technology, liquid crystal display apparatuses with high transmittance, large size, low power consumption and low cost have become a direction of future development.

SUMMARY

In an aspect, a liquid crystal display panel is provided The liquid crystal display panel includes a first polarizer, a second polarizer disposed opposite to the first polarizer, a first liquid crystal layer disposed between the first polarizer and the second polarizer, and an optical compensation layer disposed between the first liquid crystal layer and one of the first polarizer and the second polarizer. A transmission axis of the first polarizer is perpendicular to a transmission axis of the second polarizer. The first liquid crystal layer includes first liquid crystal molecules, and an included angle between an orthogonal projection of an optical axis of a first liquid crystal molecule on the first polarizer and the transmission axis of the first polarizer is an acute angle. An orthogonal projection of an optical axis of the optical compensation layer on the first polarizer is perpendicular to the orthogonal projection of the optical axis of the first liquid crystal molecule on the first polarizer.

In some embodiments, an in-plane retardation of the first liquid crystal layer is in a range of 87 nm to 263 nm, inclusive.

In some embodiments, an absolute value of a difference between an in-plane retardation of the optical compensation layer and an in-plane retardation of the first liquid crystal layer is less than or equal to 30 nm.

In some embodiments, the in-plane retardation of the optical compensation layer is equal to the in-plane retardation of the first liquid crystal layer.

In some embodiments, the optical compensation layer is a +A compensation layer.

In some embodiments, the included angle between the orthogonal projection of the optical axis of the first liquid crystal molecule on the first polarizer and the transmission axis of the first polarizer is in a range of 15° to 40°, inclusive, or in a range of 50° to 75°, inclusive.

In some embodiments, the included angle between the orthogonal projection of the optical axis of the first liquid crystal molecule on the first polarizer and the transmission axis of the first polarizer is in a range of a difference between 30° and 10° to a sum of 30° and 10°, inclusive, or in a range of a difference between 60° and 10° to a sum of 60° and 10°, inclusive.

In some embodiments, the included angle between the orthogonal projection of the optical axis of the first liquid crystal molecule on the first polarizer and the transmission axis of the first polarizer is in a range of a difference between 25° and 10° to a sum of 25° and 10°, inclusive, or in a range of a difference between 65° and 10° to a sum of 65° and 10°, inclusive.

In some embodiments, the liquid crystal display panel further includes a base substrate, and a color filter layer disposed between the base substrate and the first liquid crystal layer. The optical compensation layer is disposed between the color filter layer and the first liquid crystal layer.

In some embodiments, the optical compensation layer is a planarization layer.

In some embodiments, the liquid crystal display panel further includes a first alignment film and a second alignment film that are disposed oppositely. The first alignment film is disposed on a side of the first liquid crystal layer proximate to the first polarizer, and the first alignment film is in contact with the first liquid crystal layer. The second alignment film is disposed on a side of the first liquid crystal layer proximate to the second polarizer, and the second alignment film is in contact with the first liquid crystal layer. An alignment direction of the first alignment film is the same as an alignment direction of the second alignment film.

In some embodiments, the first liquid crystal molecules are negative liquid crystal molecules.

In some embodiments, the liquid crystal display panel further includes a second liquid crystal layer, at least one first control electrode and at least one second control electrode. The second liquid crystal layer is disposed between the first polarizer and the first liquid crystal layer, or between the second polarizer and the first liquid crystal layer, and the second liquid crystal layer includes second liquid crystal molecules. The at least one first control electrode is disposed between the first polarizer and the second liquid crystal layer, the at least one second control electrode is disposed between the second polarizer and the second liquid crystal layer, and an orthogonal projection of the at least one first control electrode on the first polarizer and an orthogonal projection of a second control electrode on the first polarizer have an overlapping region.

In some embodiments, the second liquid crystal layer is a polymer dispersed bistable nematic liquid crystal layer having a first stable state and a second stable state. In a case where the second liquid crystal layer is in the first stable state, an orthogonal projection of an optical axis of a second liquid crystal molecule on the first polarizer is parallel to the orthogonal projection of the optical axis of the optical compensation layer on the first polarizer. In a case where the second liquid crystal layer is in the second steady state, the second liquid crystal layer is in a scattering state.

In some embodiments, the second liquid crystal layer is disposed between the first liquid crystal layer and the second polarizer. The liquid crystal display panel further includes at least one third control electrode, and the at least one third control electrode and the at least one first control electrode are disposed between the first liquid crystal layer and the first polarizer. One of the at least one third control electrode and the at least one first control electrode is a pixel electrode, and another thereof is a common electrode.

In some embodiments, in a case where the liquid crystal display panel displays a non-black picture, an orthogonal projection of an optical axis of a second liquid crystal molecule on the first polarizer is parallel to the orthogonal projection of the optical axis of the optical compensation layer on the first polarizer, and an in-plane retardation of the second liquid crystal layer is in a range of 120 nm to 280 nm, inclusive.

In some embodiments, the in-plane retardation of the second liquid crystal layer is in a range of a difference between 247 nm and 20 nm to a sum of 247 nm and 20 nm, inclusive.

In some embodiments, the optical compensation layer is located between the first liquid crystal layer and the second liquid crystal layer.

In another aspect, a display apparatus is provided. The display apparatus includes the liquid crystal display panel provided in any of the above embodiments.

In yet another aspect, a driving method for a liquid crystal display panel is provided. The liquid crystal display panel is the liquid crystal display panel provided in any of the above embodiments including the second liquid crystal layer. The driving method for the liquid crystal display panel includes: driving the liquid crystal display panel to display a black picture, and applying a first vertical electric field to the second liquid crystal layer through the at least one first control electrode and the at least one second control electrode, so as to drive the optical axes of the second liquid crystal molecules in the second liquid crystal layer to be perpendicular to the first polarizer; driving the liquid crystal display panel to display a non-black picture, and withdrawing the first vertical electric field, so that orthogonal projections of the optical axes of the second liquid crystal molecules in the second liquid crystal layer on the first polarizer are parallel to the orthogonal projection of the optical axis of the optical compensation layer on the first polarizer.

In some embodiments, the second liquid crystal layer is a polymer dispersed bistable nematic liquid crystal layer, and driving the liquid crystal display panel to display the black picture, and applying the first vertical electric field to the second liquid crystal layer through the at least one first control electrode and the at least one second control electrode, so as to drive the optical axes of the second liquid crystal molecules in the second liquid crystal layer to be perpendicular to the first polarizer, includes: driving the liquid crystal display panel to convert from displaying the non-black picture to displaying the black picture; applying a second vertical electric field to the second liquid crystal layer through the at least one first control electrode and the at least one second control electrode, so that the second liquid crystal layer is in a second stable state; applying the first vertical electric field to the second liquid crystal layer through the at least one first control electrode and the at least one second control electrode, so that the optical axes of the second liquid crystal molecules are perpendicular to the first polarizer. Driving the liquid crystal display panel to display the non-black picture, and withdrawing the first vertical electric field, so that the orthogonal projections of the optical axes of the second liquid crystal molecules in the second liquid crystal layer on the first polarizer are parallel to the orthogonal projection of the optical axis of the optical compensation layer on the first polarizer, includes: driving the liquid crystal display panel to convert from displaying the black picture to displaying the non-black picture; and withdrawing the first vertical electric field, so that the second liquid crystal layer is in a first steady state. An electric field intensity of the first vertical electric field is greater than an electric field intensity of the second vertical electric field.

In yet another aspect, a driving method for a liquid crystal display panel is provided. The liquid crystal display panel is the liquid crystal display panel provided in any of the above embodiments including the second liquid crystal layer. The driving method for the liquid crystal display panel includes: driving a pixel in the liquid crystal display panel to display a black block, and applying a first vertical electric field to a portion of the second liquid crystal layer corresponding to the pixel through the at least one first control electrode and the at least one second control electrode, so as to drive optical axes of the second liquid crystal molecules in the portion of the second liquid crystal layer to be perpendicular to the first polarizer; driving the pixel in the liquid crystal display panel to display a non-black block, and withdrawing the first vertical electric field, so that orthogonal projections of the optical axes of the second liquid crystal molecules in the portion of the second liquid crystal layer corresponding to the pixel on the first polarizer are parallel to the orthogonal projection of the optical axis of the optical compensation layer on the first polarizer.

BRIEF DESCRIPTION OF THE DRAWINGS

In order to describe technical solutions in the present disclosure more clearly, accompanying drawings to be used in some embodiments of the present disclosure will be introduced briefly below, Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

FIG. 11 is a schematic diagram of test results of a liquid crystal display panel, in accordance with some embodiments;

FIG. 12 is a flow diagram of a driving method for a liquid crystal display panel, in accordance with some embodiments;

FIG. 13 is a flow diagram of a driving method for another liquid crystal display panel, in accordance with some embodiments; and FIG. 14 is a structural diagram of a display apparatus, in accordance with some embodiments.

DETAILED DESCRIPTION

Figure 1A:
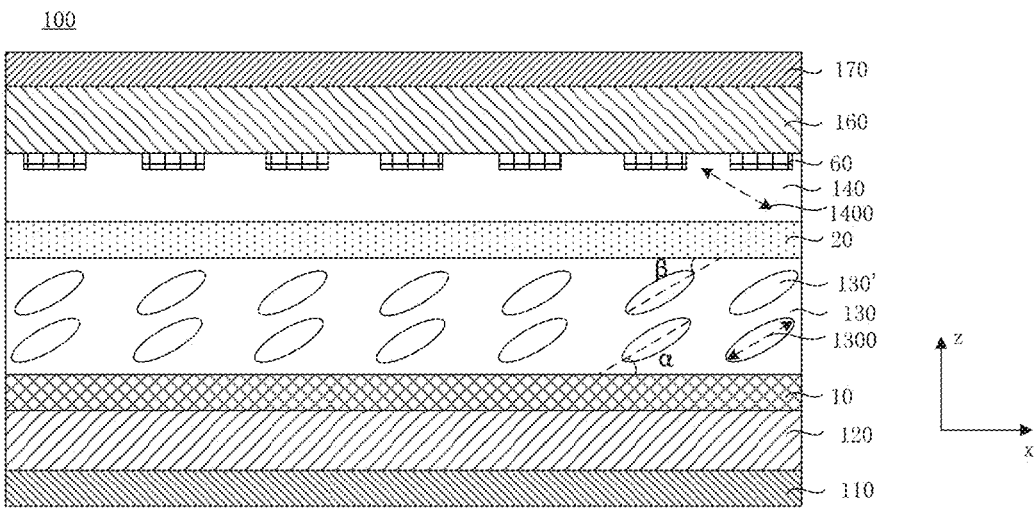
FIG. 1A is a structural diagram of a liquid crystal display panel, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

In the description of some embodiments, the terms "coupled" and "connected" and their extensions may be used. For example, the term "connected" may be used in the description of some embodiments to indicate that two or more components are in direct physical or electrical contact with each other. For another example, the term "coupled" may be used in the description of name embodiments to indicate that two or more components are in direct physical or electrical contact. However, the term "coupled" may also mean that two or more components are not in direct contact with each other but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" "if [a stated condition or event] is detected" is optionally construed as "in a case where it is determined that" or "in response to determining that" or "in a case where [the stated condition or event] is detected" or "in response to detecting [the stated condition or event]", depending on the context.

The use of "applicable for" or "configured to" herein means an open and inclusive language, which does not exclude devices that are applicable to or configured to perform additional tasks or steps.

In addition, the use of the phrase "based on" or "according to" is meant to be open and inclusive, since a process, step, calculation or other action that is "based on" or "according to" one or more of the stated conditions or values may, in practice, be based on additional conditions or values exceeding those stated.

As used herein, the term such as "about", "substantially" or "approximately" includes a stated value and an average value within an acceptable range of deviation of a particular value. The acceptable range of deviation is determined by a person of ordinary skill in the art in view of the measurement in question and errors associated with the measurement of a particular quantity (i.e., the limitations of the measurement system).

Exemplary embodiments are described herein with reference to sectional views and/or plan views as idealized exemplary drawings. In the accompanying drawings, thickness of layers and sizes of regions are enlarged for clarity. Variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art in view of measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 56°. The term "perpendicular" includes absolute perpendicularity and approximate perpendicularity, and an acceptable range of deviation of the approximate perpendicularity may also be, for example, a deviation within 5°. For example, the term "equal" includes absolute equality and approximate equality, and an acceptable range of deviation of the approximate equality may satisfy that, for example, a difference between the equal two is less than or equal to 5% of either of the two.

In addition, unless otherwise specified, liquid crystal display panels in the exemplary drawings shown herein are all in a state of no voltage being applied thereto. It can be understood that after voltages are applied to a liquid crystal display panel, at least part of liquid crystal molecules will be deflected, so as to realize a display function.

Some embodiments of the present disclosure provide a display apparatus. The display apparatus may be any apparatus that displays images whether in motion (e.g., a video) or stationary (e.g., a still image), and regardless of text or image. The display apparatus may be any of a variety of display apparatuses, which include but are not limit to mobile phones, wireless devices, personal digital assistants (PDAs), hand-held or portable computers, global positioning system (GPS) receivers/navigators, cameras, MPEG-4 part 14 (MP4) video players, video cameras, game consoles, flat panel displays, computer monitors and car displays (e.g., automobile data recorders or vehicle backup cameras).

The display apparatus is a liquid crystal display apparatus. For example, the display apparatus may be a display apparatus with an advanced super dimension switch (ADS) mode, or a display apparatus with an in-plane switching (IPS) mode, or a display apparatus with a fringe field switching (FFS) mode.

As shown in FIG. 14, the display apparatus 01 may include a liquid crystal display panel 100 and a backlight module 02, and the backlight module is used to provide light for display for the liquid crystal display panel. The backlight module may be an edge-lit backlight module, which includes, for example, a light source, a light guide plate, a reflective plate, and optical sheets.

Some embodiments of the present disclosure further provide a liquid crystal display panel. The liquid crystal display panel may be a liquid crystal display panel with the in-plane switching (IPS) mode or the advanced super dimension switch (ADS) mode. The IPS mode or the ADS mode is a common display mode used in existing wide viewing angle liquid crystal display panels, and a liquid crystal display panel adopting the IPS mode or the ADS mode may also be called a horizontal electric field type liquid crystal display panel. The display panel provided by the embodiments of the present disclosure may be the horizontal electric field type liquid crystal display panel. The liquid crystal display panel herein will be illustrated by considering an example of the ADS type liquid crystal display panel.

Figure 1B:
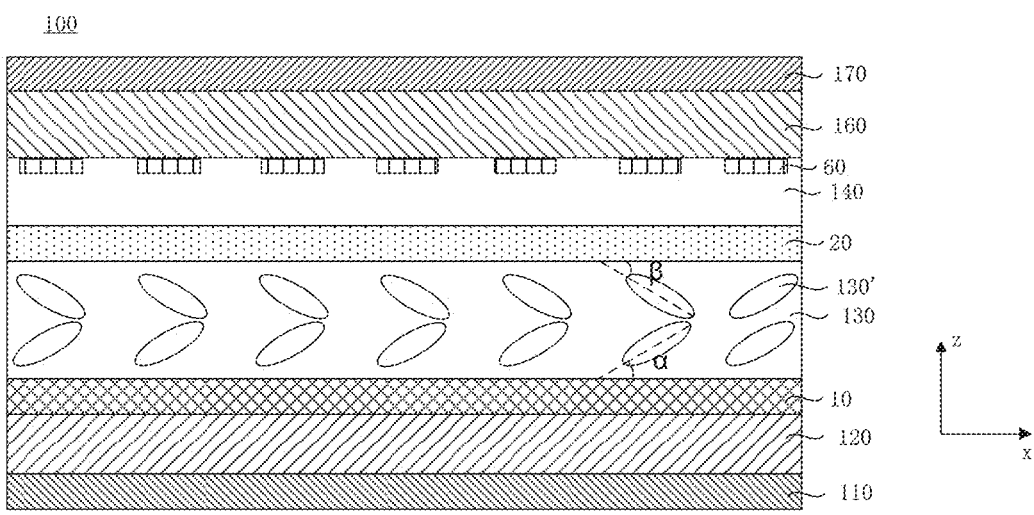
FIG. 1B is a structural diagram of a liquid crystal display panel, in accordance with some embodiments.

Referring to FIGS. 1A and 1B, the liquid crystal display panel 100 may include a first polarizer 110, a second polarizer 170 disposed opposite to the first polarizer 110, and a first liquid crystal layer 130 disposed between the first polarizer 110 and the second polarizer 170.

Figure 4A:
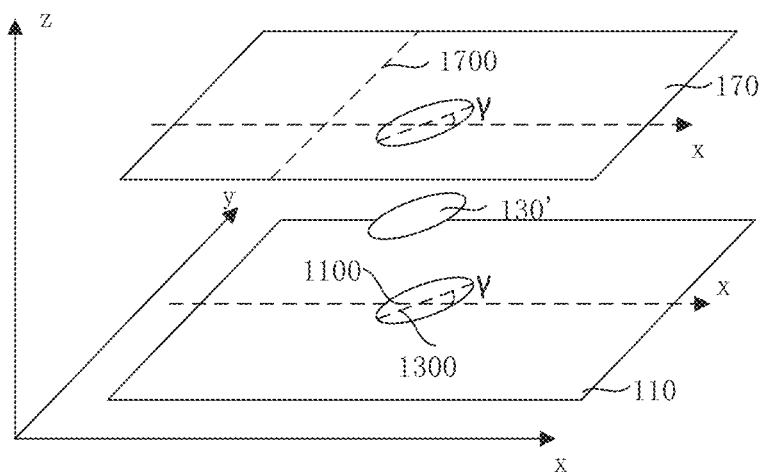
FIG. 4A is a schematic diagram of an arrangement state of first liquid crystal molecules in an initial state in a liquid crystal display panel, in accordance with some embodiments.
Figure 4B:
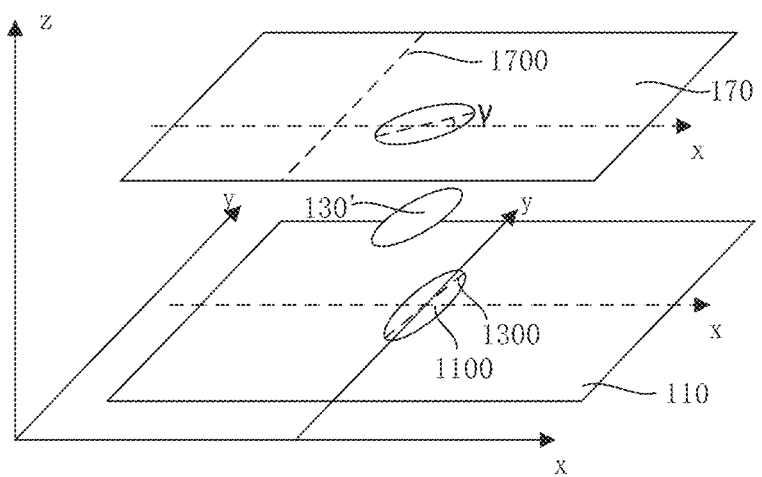
FIG. 4B is a schematic diagram of a twisted arrangement of first liquid crystal molecules in a liquid crystal display panel, in accordance with some embodiments.

The first polarizer 110 and the second polarizer 170 may be linear polarizers. The linear polarizer allows light, polarization direction of which is the same as a transmission axis direction (i.e. a polarization direction) of the linear polarizer, to pass through (i.e. exit), Therefore, the transmission axis of the linear polarizer may also be called a light transmission axis. Referring to FIGS. 4A and 4B, a transmission axis 1100 of the first polarizer 110 is perpendicular to a transmission axis 1700 of the second polarizer 170.

Positions of the first polarizer 110 and the second polarizer 170 may be set according to actual needs, and are not limited in the embodiments of the present disclosure. For ease of description, in some embodiments of the present disclosure, the first polarizer 110 is schematically closer to a backlight module than the second polarizer 170, In this case, light emitted from the backlight module may exit through the first polarizer 110, the first liquid crystal layer 130, and the second polarizer 170 in sequence. The first polarizer 110 may be configured to make the light emitted from the backlight module be linearly polarized light. In addition, since the transmission axis of the second polarizer 170 is perpendicular to the transmission axis of the first polarizer 110, the second polarizer 170 may be configured to control a degree to which the light exiting through the first liquid crystal layer 130 may pass through the second polarizer 170.

The first liquid crystal layer 130 may include first liquid crystal molecules 130'. It will be noted that liquid crystal molecules are uniaxial crystals and each have only one optical axis. An optical axis is also known as an optic axis. When light travels in a crystal, a direction in which forward speeds of two orthogonal waves are the same is an extending direction of the optical axis, and there is no change in optical properties of the light in this direction. The liquid crystal molecules may be classified into rod-like liquid crystal molecules and discotic liquid crystal molecules according to shapes thereof. For a rod-like liquid crystal molecule, a long axis direction thereof is the optical axis direction, and for a discotic liquid crystal molecule, a short axis direction thereof is the optical axis direction. In some embodiments, the first liquid crystal molecules 130' in the first liquid crystal layer 130 are all rod-like liquid crystal molecules, and long axis directions thereof are optical axis directions.

The first liquid crystal molecules 130' may be positive liquid crystal molecules or negative liquid crystal molecules. In some embodiments, the first liquid crystal molecules are the negative liquid crystal molecules. In a case where the liquid crystal display panel display a non-black picture, transmittance of the liquid crystal display panel is relatively high by adopting the negative liquid crystal molecules as the first liquid crystal molecules 130', As a result, the liquid crystal display panel adopting the negative liquid crystal molecules has relatively high contrast and a relatively good display effect.

In some embodiments, as shown in FIGS. 1A and 1B, the liquid crystal display panel 100 further includes a first alignment film 10 and a second alignment film 20 that are oppositely disposed.

Figure 1C:
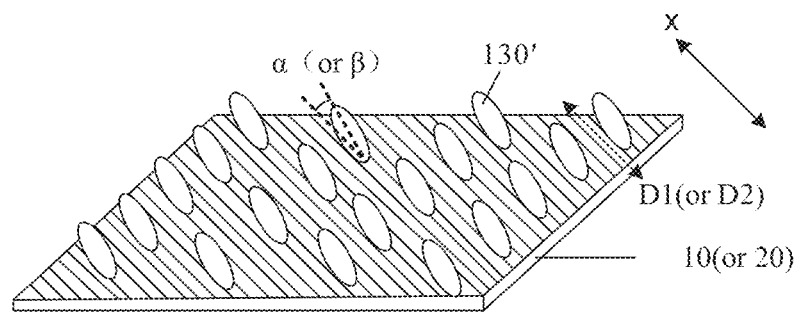
FIG. 1C is a structural diagram of a first alignment film or a second alignment film, in accordance with some embodiments.

Alignment films (which include the first alignment film 10 and the second alignment film 20) are made of a polymer material, and the polymer material is, for example, polyimide (PI). Referring to FIG. 1C, the alignment films (which include the first alignment film 10 and the second alignment film 20) have alignment directions. For example, the first alignment film 10 has an alignment direction D1, the second alignment film 20 has an alignment direction D2, and the alignment directions D1 and D2 are parallel to an x-direction shown in FIG. 1C. Since the alignment film has the alignment direction, orthogonal projections of long axes of liquid crystal molecules (e.g., first liquid crystal molecules 130' shown in FIG. 1C) proximate to the alignment film on the alignment film may be parallel to the alignment direction. On a basis of determining the alignment direction of the alignment film, an included angle, for example, an angle α (or an angle β) shown in FIG. 1C, is formed between a long axis direction of a liquid crystal molecule proximate to the alignment film and the alignment direction of the alignment film, and the included angle may be referred to as a pretilt angle.

With continued reference to FIGS. 1A and 1B, the first alignment film 10 is disposed on a side of the first liquid crystal layer 130 proximate to the first polarizer 110, and the first alignment film 10 is in contact with the first liquid crystal layer 130. Since the first alignment film 10 has the above properties, the first alignment film 10 may control an arrangement of first liquid crystal molecules 130' in the first liquid crystal layer 130 proximate to the first alignment film 10, That is, the first alignment film 10 may make orthogonal projections of long axes (e.g. optical axes) of the first liquid crystal molecules 130' proximate to the first alignment film 10 on the first polarizer 110 parallel to the alignment direction of the first alignment film 10, and may also make the first liquid crystal molecules 130' proximate to the first alignment film 10 form first pretilt angles α. The alignment direction of the first alignment film 10 may be parallel to the x-direction (a left-right direction in the drawings) in FIGS. 1A and 1B, and a first pretilt angle α of the first liquid crystal molecule 130' may be an acute angle between a long axis of the first liquid crystal molecule 130' proximate to the first alignment film 10 and the alignment direction of the first alignment film 10.

The second alignment film 20 is disposed on a side of the first liquid crystal layer 130 proximate to the second polarizer 170, and the second alignment film 20 is in contact with the first liquid crystal layer 130. Since the second alignment film 20 has the above-mentioned properties, the second alignment film 20 may control an arrangement of first liquid crystal molecules 130' in the first liquid crystal layer 130 proximate to the second alignment film 20. That is, the second alignment film 20 may make orthogonal projections of long axes of the first liquid crystal molecules 130' proximate to the second alignment film 20 on the first polarizer 110 parallel to the alignment direction of the second alignment film 20, and may also make the first liquid crystal molecules 130' proximate to the second alignment film 20 form second pretilt angles β. The alignment direction of the second alignment film 20 may be the same as the alignment direction of the first alignment film 10, for example, may be parallel to the x-direction in FIGS. 1A and 1B, and a second pretilt angle β of the first liquid crystal molecule 130' may be an acute angle between a long axis of the first liquid crystal molecule 130' proximate to the second alignment film 20 and the alignment direction of the second alignment film 20.

For example, the first liquid crystal molecules 130' proximate to the first alignment film 10 are a layer of first liquid crystal molecules 130' closest to the first alignment film 10, and the first liquid crystal molecules 130' proximate to the second alignment film 20 are a layer of first liquid crystal molecules 130' closest to the second alignment film 20. As illustrations, FIGS. 1A and 1B only show the layer of first liquid crystal molecules 130' closest to the first alignment film 10 in the first liquid crystal molecule layer 130 and the layer of first liquid crystal molecules 130' closest to the second alignment film 20 in the first liquid crystal molecule layer 130.

Figure 1D:
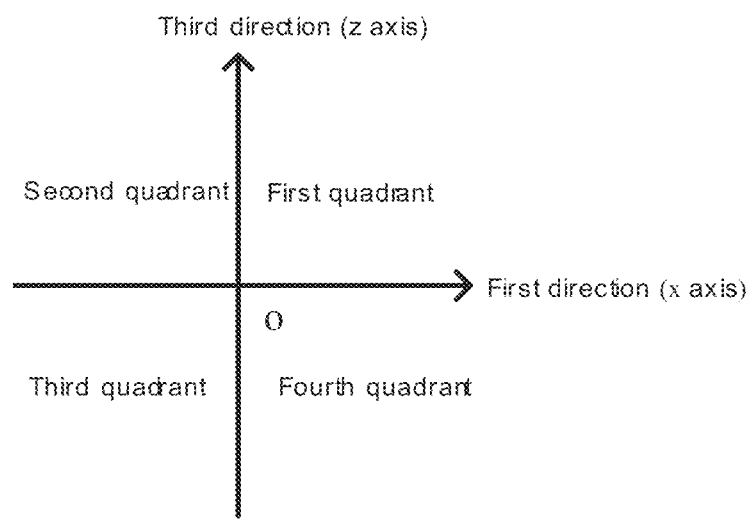
FIG. 1D is a schematic diagram of an xoz plane rectangular coordinate system, in accordance with some embodiments.

In addition, the pretilt angles (which include the first pretilt angle α and the second pretilt angle β) may each have a direction. Referring to FIG. 1D in conjunction with FIGS. 1A to 1C, a plane rectangular coordinate system xoz is established, A straight line where an optical axis of a first liquid crystal molecule 130' (which may also be referred to as an initial optical axis of the first liquid crystal molecule 130') in an initial state (the liquid crystal display panel 100 is in a non-powered state) is located in the established coordinate system xoz, and the straight line where the optical axis of the first liquid crystal molecule 130' is located passes through point o. A z-direction in the plane rectangular coordinate system xoz is a thickness direction of the liquid crystal display panel 100. The rectangular coordinate system xoz is divided into 4 quadrants. As shown in FIG. 1D, an upper right portion of the rectangular coordinate system xoz is called a first quadrant, and the other three portions are called a second quadrant, a third quadrant and a fourth quadrant sequentially in a counterclockwise direction. In a case where two straight lines (i.e. straight lines where optical axes of two liquid crystal molecules are located respectively) both pass through the first quadrant and the third quadrant, directions of two pretilt angles determined by the two straight lines are the same. In a case where the two straight lines both pass through the second quadrant and fourth quadrant, the directions of the two pretilt angles determined by the two straight lines are also the same. In a case where one of the straight lines passes through the first quadrant and third quadrant, and the other straight line passes through the second quadrant and fourth quadrant, the directions of the two pretilt angles determined by the two straight lines are opposite.

Directions of the first pretilt angle α and the second pretilt angle β may be the same or different, which will not be limited in the embodiments of the present disclosure. For example, FIG. 1A shows a case where the directions of the first pretilt angle α and the second pretilt angle β are the same, and FIG. 1B shows a case where the directions of the first pretilt angle α and the second pretilt angle β are different.

Further, degrees of the first pretilt angle α and the second pretilt angle β may be relatively small. For example, the first pretilt angle α and the second pretilt angle β are each in a range of a difference between 2° and 1° to a sum of 2° and 1°, inclusive (i.e., 2°±1°), that is, the ranges of the two are both 1° to 3°, inclusive (i.e., [1°, 3°]). For example, the first pretilt angle α and the second pretilt angle β are both 1°. Since the degrees of the first pretilt angle α and the second pretilt angle β are small, and the alignment directions of the first alignment film 10 and the second alignment film 20 are the same, it may be considered that long axis directions of the first liquid crystal molecules 130' proximate to the first alignment film 10 actually and long axis directions of the first liquid crystal molecule 130' proximate to the second alignment film 20 actually are substantially parallel. Since the degrees of the first pretilt angle α and the second pretilt angle β are small, which may be ignored, and the first liquid crystal molecules 130' in the first liquid crystal layer 130 have intermolecular forces therebetween, long axes of the first liquid crystal molecules 130' in the first liquid crystal layer 130 may be parallel or approximately parallel to each other, so that it may be considered that the long axes of the first liquid crystal molecules 130' in the first liquid crystal layer 130 are all parallel or approximately parallel to a plane where the first alignment film 10 is located and/or a plane where the second alignment film 20 is located, and are all parallel or approximately parallel to the alignment directions of the first alignment film 10 and the second alignment film 20. For example, the long axes of the first liquid crystal molecules 130' in the first liquid crystal layer 130 are all parallel to the x-direction in FIGS. 1A and 1B.

In some embodiments, the first liquid crystal molecules 130' may have no pretilt angle. In this case, the long axes of the first liquid crystal molecules 130' in the first liquid crystal layer 130 may be parallel to the plane where the first alignment film 10 is located and/or the plane where the second alignment film 20 is located, and parallel to the alignment directions of the first alignment film 10 and/or the second alignment film 20. For example, the long axes of the first liquid crystal molecules 130' in the first liquid crystal layer 130 may be parallel to the x-direction in FIGS. 1A and 1B.

A refractive index of the first liquid crystal layer 130 may satisfy that $n_{xLC}$ is greater than $n_{yLC}$ and $n_{yLC}$ is approximately equal to $n_{zLC}$ ($n_{xLC} > n_{yLC} \sim n_{zLC}$), or $n_{xLC}$ is greater than $n_{yLC}$ and $n_{yLC}$ is equal to $n_{zLC}$ ($n_{xLC} > n_{yLC} = n_{zLC}$), where $n_{xLC}$ is a refractive index of the first liquid crystal layer 130 in a direction of X-axis in a plane of the first liquid crystal layer 130, $n_{yLC}$ is a refractive index of the first liquid crystal layer 130 in a direction of Y-axis perpendicular to the X-axis in the plane of the first liquid crystal layer 130, and $n_{zLC}$ is a refractive index in a thickness direction of the first liquid crystal layer 130. The direction of X-axis may be an optical axis direction of the first liquid crystal layer 130. For example, in a case where the optical axes of the first liquid crystal molecules 130' in the first liquid crystal layer 130 are arranged in the same direction or approximately the same direction, it may be considered that the optical axis direction of the first liquid crystal layer 130 is the optical axes direction of the first liquid crystal molecules 130' in the first liquid crystal layer 130. It will be noted that, in a case where there is a small tilt angle (e.g., a tilt angle within 5°) between the X-axis and the liquid crystal layer 130, it may also be considered that the X-axis is in the plane of the liquid crystal layer 130. Based on this, an in-plane retardation $R_{OLC}$ of the first liquid crystal layer 130 satisfies that $R_{OLC} = (n_{xLC} - n_{yLC}) \times d_{LC}$ where $d_{LC}$ is the thickness of the first liquid crystal layer 130. The in-plane retardation of the first liquid crystal layer 130 can be understood as an actual retardation of light passing through the first liquid crystal layer 130 in a normal direction (a direction perpendicular to the first liquid crystal layer 130).

A response speed of the liquid crystal display panel 100 may be adjusted by changing the thickness of the first liquid crystal layer 130. In a case where the thickness of the first liquid crystal layer 130 is reduced, the response speed of the liquid crystal display panel 100 may increase and response time of the liquid crystal display panel 100 may decrease. The response speed of the liquid crystal display panel 100 refers to timeliness of the picture displayed on the liquid crystal display panel 100 changing along with input signals thereof, which may be characterized by the response time. The less the response time, the faster the response speed. The response time may be a sum of turn-on time (which may be denoted as $T_{on}$) and turn-off time (which may be denoted as $T_{off}$) of the liquid crystal display panel 100. The turn-on time may represent a time when brightness of the liquid crystal display panel 100 rises from 0% to 90% in a process from a power-off state to a power-on state, and the turn-off time may represent a time when the brightness of the liquid crystal display panel 100 drops from 100% to 10% in a process from the power-on state to the power-off state, where 0% is minimum brightness of full black, and 100% is maximum brightness of full white. If the response time is too long, pixels of the liquid crystal display panel cannot keep up with the response speed of the input voltages, so that after-image and/or trailing will appear when high-speed images are viewed, thereby affecting user's experience.

Figure 2A:
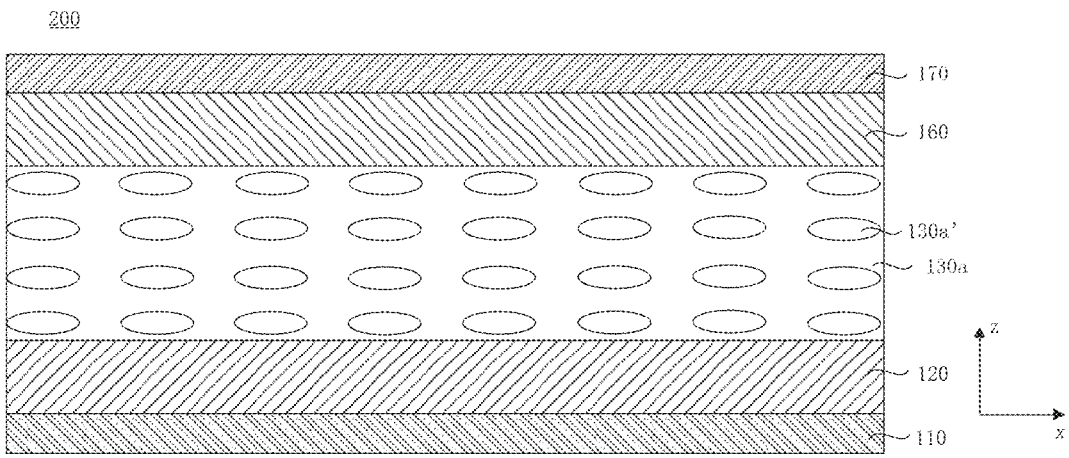
FIG. 2A is a structural diagram of a liquid crystal display panel in the related art.
Figure 2B:
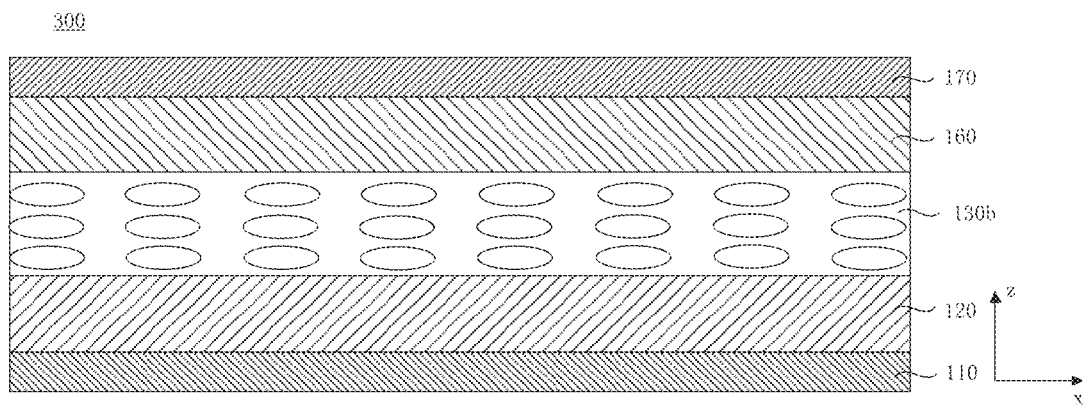
FIG. 2B is a structural diagram of another liquid crystal display panel in the related art.

FIG. 2A shows a structure of a liquid crystal display panel in the related art, and FIG. 2B shows a liquid crystal display panel in which a thickness of the first liquid crystal layer (also referred to as a cell gap) is reduced compared with a thickness of the first liquid crystal layer in FIG. 2A. For convenience of description, FIGS. 2A and 2B only show a portion of the structure of the liquid crystal display panel, such as a first liquid crystal layer 130a in the liquid crystal display panel 200 and a first liquid crystal layer 130b in the liquid crystal display panel 300, while other structures such as alignment films are omitted. The thickness of the first liquid crystal layer 130b in FIG. 2B may be the same as the thickness of the first liquid crystal layer 130 in the liquid crystal display panel 100 provided by the embodiments of the present disclosure shown in FIGS. 1A and 1B, and are all significantly less than the thickness of the first liquid crystal layer 130a in FIG. 2A. With continued reference to FIGS. 1A and 1B, it will be seen that, in some embodiments, the thickness of the first liquid crystal layer 130 (which may also be referred to as the cell gap of the first liquid crystal layer 130) is relatively small. For example, the thickness of the first liquid crystal layer 130a shown in FIG. 2A is 350 nm, while the thickness of the first liquid crystal layer 130 in the embodiments of the present disclosure shown in FIGS. 1A and 1B is 175 nm. In this way, the response time of the liquid crystal display panel 100 may be greatly reduced. Accordingly, the in-plane retardation of the first liquid crystal layer 130 may be reduced. For example, the in-plane retardation of the first liquid crystal layer 130 is in a range of 87 nm to 263 nm, inclusive.

Figure 3A:
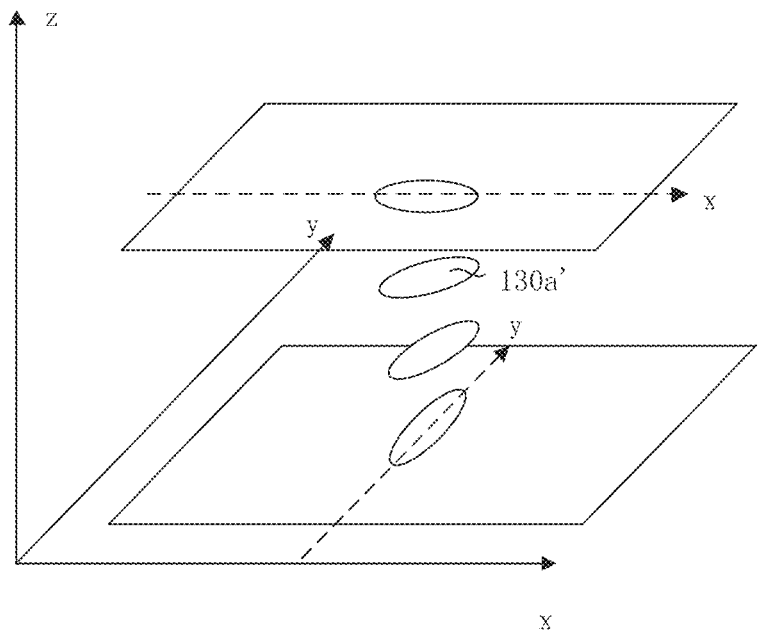
FIG. 3A is a schematic diagram of a twisted arrangement of first liquid crystal molecules in a liquid crystal display panel in the related art.
Figure 3B:
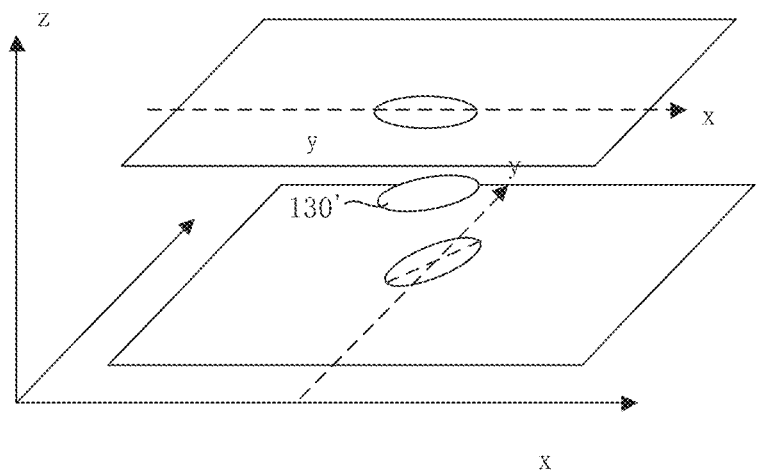
FIG. 3B is a schematic diagram of a twisted arrangement of first liquid crystal molecules in a liquid crystal display panel, in accordance with some embodiments.

However, the thickness of the first liquid crystal layer also affects transmittance of the liquid crystal display panel. Compared with a liquid crystal display panel with the thickness of the first liquid crystal layer not reduced, the transmittance of the liquid crystal display panel with the thickness of the first liquid crystal layer reduced decreases. Referring to FIGS. 2A and 3A, the ADS type liquid crystal display panel will be described below as an example. For example, the arrangement of first liquid crystal molecules 130a' are controlled through the alignment film, so that optical axes of the first liquid crystal molecules 130a' are parallel or approximately parallel to each other, and are all parallel or approximately parallel to a plane where the first polarizer 110 is located. Moreover, in some embodiments, the liquid crystal display panel 200 may further include pixel electrodes and common electrode(s) that are disposed between the first liquid crystal layer 130a and the first polarizer 110, and the pixel electrodes and the common electrode(s) may generate a horizontal electric field in the first liquid crystal layer 130a. The horizontal electric field may be an electric field, a direction of which is parallel to the plane where the first liquid crystal layer 130a is located, and the horizontal electric field may cause the first liquid crystal molecules 130a' to rotate in the first liquid crystal layer 130a. The following will be illustrated by considering an example where the pixel electrodes and the common electrode(s) are disposed on a side of the first liquid crystal layer 130a proximate to the first polarizer 110, an electric field direction of the horizontal electric field is perpendicular to the x-direction (i.e. the electric field direction of the horizontal electric field is parallel to a y-direction), and the transmission axis of the first polarizer 110 is parallel to the x-direction. After the voltages are applied, the horizontal electric field may be generated in the first liquid crystal layer 130a, and the first liquid crystal molecules 130a' rotate in the first liquid crystal layer 130a, so that optical axes of the first liquid crystal molecules 130a' tend to be along the electric field direction, that is, arranged in a direction parallel to the y-direction. In a case where an electric field intensity increases, a rotation angle of a first liquid crystal molecule 130a' may increase, that is, an included angle between an orthogonal projection of an optical axis of the first liquid crystal molecule 130a' on the first polarizer 110 and the transmission axis of the first polarizer 110 increases. Moreover, the pixel electrodes and the common electrode(s) are disposed on the side of the first liquid crystal layer 130a proximate to the first polarizer 110. The closer the pixel electrodes and the common electrode(s) are to the first polarizer 110, the stronger the electric field intensity of the horizontal electric field is. As a result, the closer the first liquid crystal molecule 130a' is to the first polarizer 110, the greater the rotation angle, and the greater the included angle between the orthogonal projection of the optical axis of the first liquid crystal molecule 130a' on the first polarizer 110 and the transmission axis of the first polarizer 110. In this way, in a direction parallel to the z-direction, the first liquid crystal molecules 130a' may form a twisted arrangement shown in FIG. 3A, and the optical axes of the first liquid crystal molecules 130a' gradually tend to be parallel to the y-axis. When an included angle between an orthogonal projection of an optical axis of a first liquid crystal molecule 130a' with a largest rotation angle on the first polarizer 110 and the transmission axis of the first polarizer 110 is about 90°, that is, when the orthogonal projection of the optical axis of the first liquid crystal molecule 130a' with the largest rotation angle on the first polarizer 110 is parallel to the y-axis, the transmittance of the liquid crystal display panel may be maximized. However, in the liquid crystal display panel provided by the embodiments of the present disclosure, the thickness of the first liquid crystal layer is reduced. For example, the thickness of the first liquid crystal layer in the liquid crystal display panel provided by the embodiments of the present disclosure may be the same as the thickness of the first liquid crystal layer 130b shown in FIG. 2B, referring to FIGS. 2A and 2B, it will be seen that the thickness of the first liquid crystal layer in the liquid crystal display panel provided by the embodiments of the present disclosure is reduced compared with the thickness of the first liquid crystal layer 130a shown in FIG. 2A. Referring to FIGS. 1A and 3B, in the liquid crystal display panel provided by the embodiments of the present disclosure, since the thickness of the first liquid crystal layer is small, the rotation angle of the first liquid crystal molecule 130' with the largest rotation angle cannot reach 90° under the same operating voltages, that is, the orthogonal projection of the first liquid crystal molecule 130' with the largest rotation angle on the first polarizer 110 is not parallel to the y-axis, which may reduce the transmittance.

In order to solve this problem, referring to FIGS. 1A and 4A, in the liquid crystal display panel provided by the embodiments of the present disclosure, an acute angle γ is formed between the orthogonal projection of the optical axis 1300 of the first liquid crystal molecule 130' on the first polarizer 110 and the transmission axis 1100 of the first polarizer 110 in a case where no voltage is applied. For example, the transmission axis of the first polarizer 110 is parallel to the x-direction, and by providing the first alignment film 10 and the second alignment film 20, in the case where no voltage is applied, the optical axis of the first liquid crystal molecule 130' in the first liquid crystal layer 130 is parallel or approximately parallel to the plane where the first polarizer 110 is located, and the acute angle γ is formed between the orthogonal projection of the optical axis of the first liquid crystal molecule 130' on the first polarizer 110 and the transmission axis of the first polarizer 110. In this way, referring to FIGS. 1A and 4B, compared with FIG. 3B, the first liquid crystal molecule 130' may be rotated by a large angle relative to the transmission axis of the first polarizer 110 due to an act of the electric field. For example, the rotation angle of the first liquid crystal molecule 130' with the largest rotation angle is approximately 90°, and the orthogonal projection of the optical axis of the first liquid crystal molecule 130' with the largest rotation angle on the first polarizer 110 may be approximately parallel to the transmission axis of the first polarizer 110. In this way, the transmittance of the liquid crystal display panel 100 may be improved without increasing the operating voltages of the liquid crystal display panel 100, which may make up for a loss of transmittance due to the reduction in the thickness of the first liquid crystal layer.

In addition, since the acute angle γ is formed between the orthogonal projection of the optical axis of the first liquid crystal molecule 130' on the first polarizer 110 and the transmission axis of the first polarizer 110 in the initial state, the response speed of the liquid crystal display panel may be improved. It is still illustrated by considering an example where the direction of the horizontal electric field is parallel to the y-direction and the transmission axis of the first polarizer 110 is parallel to the x-direction. Since the acute angle γ is formed between the orthogonal projection of the optical axis of the first liquid crystal molecule 130' on the first polarizer 110 and the transmission axis of the first polarizer 110, an included angle between the orthogonal projection of the optical axis of the first liquid crystal molecule 130' on the first polarizer 110 and the direction of the horizontal electric field is a complementary angle of the acute angle γ. In this way, compared with the case where the orthogonal projection of the optical axis of the first liquid crystal molecule on the first polarizer is parallel or approximately parallel to the transmission axis of the first polarizer in the case where no voltage is applied (i.e., the optical axis of the first liquid crystal molecule is perpendicular or approximately perpendicular to the direction of the horizontal electric field in the case where no voltage is applied, that is, the angle between the orthogonal projection of the optical axis of the first liquid crystal molecule on the first polarizer and the direction of the horizontal electric field is 90° in the case where no voltage is applied), the first liquid crystal molecule 130' is easier to rotate due to the act of the horizontal electric field, and in turn, the response speed of the liquid crystal display panel may be improved.

In some embodiments, the acute angle γ formed between the orthogonal projection of the optical axis of the first liquid crystal molecule 130' on the first polarizer 110 and the transmission axis of the first polarizer 110 is in a range of 15° to 40°, inclusive. For example, the acute angle γ between the orthogonal projection of the optical axis of the first liquid crystal molecule 130' on the first polarizer 110 and the transmission axis of the first polarizer 110 is 15°, 20°, 25°, 30°, 35°, or 40°. The transmission axis of the first polarizer 110 is perpendicular to the transmission axis of the second polarizer 170, accordingly, an included angle between an orthogonal projection of the optical axis of the first liquid crystal molecule 130' on the second polarizer 170 and the transmission axis of the second polarizer 170 is in a range of 50° to 75°, inclusive. For example, the included angle between the orthogonal projection of the optical axis of the first liquid crystal molecule 130' on the second polarizer 170 and the transmission axis of the second polarizer 170 is 50°, 55°, 60°, 65°, 70°, or 75°. Alternatively, the acute angle γ formed between the orthogonal projection of the optical axis of the first liquid crystal molecule 130' on the first polarizer 110 and the transmission axis of the first polarizer 110 is in a range of 50° to 70°, inclusive. For example, the acute angle γ between the orthogonal projection of the optical axis of the first liquid crystal molecule 130' on the first polarizer 110 and the transmission axis of the first polarizer 110 is 50°, 55°, 60°, 65°, 70°, or 75°. The transmission axis of the first polarizer 110 is perpendicular to the transmission axis of the second polarizer 170, accordingly, the included angle between the orthogonal projection of the optical axis of the first liquid crystal molecule 130' on the second polarizer 170 and the transmission axis of the second polarizer 170 is in a range of 15° to 40°, inclusive. For example, the included angle between the orthogonal projection of the optical axis of the first liquid crystal molecule 130' on the second polarizer 170 and the transmission axis of the second polarizer 170 is 15°, 20°, 25°, 30°, 35°, or 40°.

In some embodiments, the acute angle γ formed between the orthogonal projection of the optical axis of the first liquid crystal molecule 130' on the first polarizer 110 and the transmission axis of the first polarizer 110 is in a range of a difference between 30° and 10° to a sum of 30° and 10°, inclusive (i.e., 30°±10°). That is, the acute angle γ is in a range of 20° to 40°, inclusive (i.e., [20°, 40°]). For example, the acute angle γ between the orthogonal projection of the optical axis of the first liquid crystal molecule 130' on the first polarizer 110 and the transmission axis of the first polarizer 110 is in a range of a difference between 30° and 5° to a sum of 30° and 5°, inclusive (i.e., 30°±5°), in a range of a difference between 30° and 3° to a sum of 30° and 3°, inclusive (i.e., 30°±3°), or in a range of a difference between 30° and 1° to a sum of 30° and 1°, inclusive (i.e., 30°±1°). For example, the acute angle γ between the orthogonal projection of the optical axis of the first liquid crystal molecule 130' on the first polarizer 110 and the transmission axis of the first polarizer 110 is 30°. Accordingly, the included angle between the orthogonal projection of the optical axis of the first liquid crystal molecule 130' on the second polarizer 170 and the transmission axis of the second polarizer 170 is in a range of a difference between 60° and 10° to a sum of 60° and 10°, inclusive (i.e., 60°±10°). That is, the included angle is in a range of 50° to 70°, inclusive (i.e., [50°, 70°]). For example, an acute angle formed between the orthogonal projection of the optical axis of the first liquid crystal molecule 130' on the second polarizer 170 and the transmission axis of the second polarizer 170 is in a range of a difference between 60° and 5° to a sum of 60° and 5°, inclusive (i.e., 60°±5°), in a range of a difference between 60° and 3° to a sum of 60° and 3°, inclusive (i.e., 60°±3°), or in a range of a difference between 60° and 1° to a sum of 60° and 1°, inclusive (i.e., 60°±1°). For example, the acute angle formed between the orthogonal projection of the optical axis of the first liquid crystal molecule 130' on the second polarizer 170 and the transmission axis of the second polarizer 170 is 60°.

In some other embodiments, the acute angle γ formed between the orthogonal projection of the optical axis of the first liquid crystal molecule 130' on the first polarizer 110 and the transmission axis of the first polarizer 110 is in a range of a difference between 60° and 10° to a sum of 60° and 10°, inclusive (i.e., 60°±10°). That is, the acute angle γ is in a range of 50° to 70°, inclusive (i.e., [50°, 70°]), For example, the acute angle γ between the orthogonal projection of the optical axis of the first liquid crystal molecule 130' on the first polarizer 110 and the transmission axis of the first polarizer 110 is in a range of a difference between 60° and 5° to a sum of 60° and 5°, inclusive (i.e., 60°±5°), in a range of a difference between 60° and 3° to a sum of 60° and 3°, inclusive (i.e., 60°±3°), or in a range of a difference between 60° and 1° to a sum of 60° and 1°, inclusive (i.e., 60°±1°). For example, the acute angle γ formed between the orthogonal projection of the optical axis of the first liquid crystal molecule 130' on the first polarizer 110 and the transmission axis of the first polarizer 110 is 60°. Accordingly, the included angle between the orthogonal projection of the optical axis of the first liquid crystal molecule 130' on the second polarizer 170 and the transmission axis of the second polarizer 170 is in a range of a difference between 30° and 10° to a sum of 30° and 10°, inclusive (i.e., 30°±10°). That is, the included angle is in a range of 20° to 40°, inclusive (i.e., [20°, 40°]). For example, the acute angle formed between the orthogonal projection of the optical axis of the first liquid crystal molecule 130' on the second polarizer 170 and the transmission axis of the second polarizer 170 may be in a range of a difference between 30° and 5° to a sum of 30° and 5°, inclusive (i.e., 30°±5°), in a range of a difference between 30° and 3° to a sum of 30° and 3°, inclusive (i.e., 30°±3°), or in a range of a difference between 30° and 16° to a sum of 30° and 1° inclusive (i.e., 30°±1°)°. For example, the acute angle formed between the orthogonal projection of the optical axis of the first liquid crystal molecule 130' on the second polarizer 170 and the transmission axis of the second polarizer 170 is 30°. In this way, the transmittance of the liquid crystal display panel may be further optimized.

In some embodiments, the acute angle γ formed between the orthogonal projection of the optical axis of the first liquid crystal molecule 130' on the first polarizer 110 and the transmission axis of the first polarizer 110 is in a range of a difference between 25° and 10° to a sum of 25° and 10°, inclusive (i.e., 25°±10°). That is, the acute angle γ is in a range of 15° to 35°, inclusive (i.e., [15°, 35°]). For example, the acute angle γ formed between the orthogonal projection of the optical axis of the first liquid crystal molecule 130' on the first polarizer 110 and the transmission axis of the first polarizer 110 is in a range of a difference between 25° and 5° to a sum of 25° and 5°, inclusive (i.e., 25°±5°), in a range of a difference between 25° and 3° to a sum of 25° and 3°, inclusive (i.e., 25°±3°), or in a range of a difference between 25° and 1° to a sum of 25° and 1°, inclusive (i.e., 25°±1°). For example, the acute angle γ formed between the orthogonal projection of the optical axis of the first liquid crystal molecule 130' on the first polarizer 110 and the transmission axis of the first polarizer 110 is 25°. Accordingly, the included angle between the orthogonal projection of the optical axis of the first liquid crystal molecule 130' on the second polarizer 170 and the transmission axis of the second polarizer 170 is in a range of a difference between 65° and 10° to a sum of 65° and 10°, inclusive (i.e., 65°±10°). That is, the included angle is in a range of 55° to 75°, inclusive (i.e., [55°, 75°]). For example, the acute angle formed between the orthogonal projection of the optical axis of the first liquid crystal molecule 130' on the second polarizer 170 and the transmission axis of the second polarizer 170 is in a range of a difference between 65° and 5° to a sum of 65° and 5°, inclusive (i.e., 65°±5°), in a range of a difference between 65° and 3° to a sum of 65° and 3°, inclusive (i.e., 65°±3°), or in a range of a difference between 65° and 1° to a sum of 65° and 1°, inclusive (i.e., 65°±1°). For example, the acute angle formed between the orthogonal projection of the optical axis of the first liquid crystal molecule 130' on the second polarizer 170 and the transmission axis of the second polarizer 170 is 65°.

In some other embodiments, the acute angle γ formed between the orthogonal projection of the optical axis of the first liquid crystal molecule 130' on the first polarizer 110 and the transmission axis of the first polarizer 110 is in a range of a difference between 65° and 10° to a sum of 65° and 10°, inclusive (i.e., 65°±10°). That is, the acute angle γ is in a range of 55° to 75°, inclusive (i.e., [55°, 75°]). For example, the acute angle γ formed between the orthogonal projection of the optical axis of the first liquid crystal molecule 130' on the first polarizer 110 and the transmission axis of the first polarizer 110 is in a range of a difference between 65° and 5° to a sum of 65° and 5°, inclusive (i.e., 65°±5°), in a range of a difference between 65° and 3° to a sum of 65° and 3°, inclusive (i.e., 65°±3°), or in a range of a difference between 65° and 1° to a sum of 65° and 1°, inclusive (i.e., 65°±1°). For example, the acute angle γ formed between the orthogonal projection of the optical axis of the first liquid crystal molecule 130' on the first polarizer 110 and the transmission axis of the first polarizer 110 is 65°. Accordingly, the included angle between the orthogonal projection of the optical axis of the first liquid crystal molecule 130' on the second polarizer 170 and the transmission axis of the second polarizer 170 is in a range of a difference between 25° and 10° to a sum of 25° and 10°, inclusive (i.e., 25°±10°), That is, the included angle is in a range of 15° to 35°, to inclusive (i.e., [15°, 35°]). For example, the acute angle formed between the orthogonal projection of the optical axis of the first liquid crystal molecule 130' on the second polarizer 170 and the transmission axis of the second polarizer 170 may be in a range of a difference between 25° and 5° to a sum of 25° and 5°, inclusive (i.e., 25°±5°), in a range of a difference between 25° and 3° to a sum of 25° and 3°, inclusive (i.e., 25°±3°), or in a range of a difference between 25° and 1° to a sum of 25° and 1°, inclusive (i.e., 25°±1°). For example, the acute angle formed between the orthogonal projection of the optical axis of the first liquid crystal molecule 130' on the second polarizer 170 and the transmission axis of the second polarizer 170 is 25°. In this way, the transmittance of the liquid crystal display panel may be further optimized.

Figure 5:
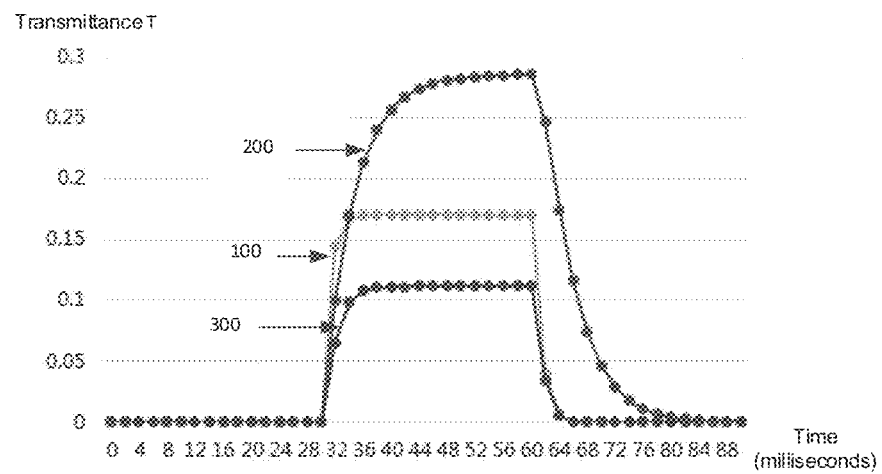
FIG. 5 is a schematic diagram of relationship curves each between response time and transmittance of a liquid crystal display panel, in accordance with some embodiments.

For example, referring to FIG. 5, FIG. 5 shows curves of transmittance versus time of the liquid crystal display panel 100 provided by the embodiments of the present disclosure, the liquid crystal display panel 200 in the related art 1 shown in FIG. 2A, and the liquid crystal display panel 300 in the related art 2 shown in FIG. 2B. It will be seen by contrast that, in a case where the same voltages are applied to the liquid crystal display panel 100, the liquid crystal display panel 200 and the liquid crystal display panel 300, the liquid crystal display panel 100 has higher increasing speed of transmittance than the liquid crystal display panel 200 and the liquid crystal display panel 300. That is, the liquid crystal display panel 100 has less response time and faster response speed.

In addition, referring to FIGS. 1A and 1B, the liquid crystal display panel provided by the embodiments of the present disclosure further includes an optical compensation layer 140. The optical compensation layer 140 includes an anisotropic crystal layer having at least one optical axis. In some embodiments, the optical compensation layer 140 is a uniaxial optical compensation layer having only one optical axis 1400. For example, the optical compensation layer 140 is a +A compensation layer, and a refractive index of the optical compensation layer 140 may satisfy that $n_{x1}$ is greater than $n_{y1}$ and $n_{y1}$ is approximately equal to $n_{z1}$ (i.e., $n_{x1} > n_{y1} \approx n_{z1}$), or $n_{x1}$ is greater than $n_{y1}$ and $n_{y1}$ is equal to $n_{z1}$ (i.e., $n_{x1} > n_{y1} = n_{z1}$), where $n_{x1}$ is a refractive index of the optical compensation layer 140 in a direction of $X_1$-axis in a plane of the optical compensation layer 140, $n_{y1}$ is a refractive index of the optical compensation layer 140 in a direction of $Y_1$-axis perpendicular to the $X_1$ axis in the plane of the optical compensation layer 140, and $n_{z1}$ is a refractive index of the optical compensation layer 140 in a thickness direction of the optical compensation layer 140. The $X_1$ axis is the optical axis of the optical compensation layer 140. Further, $n_{x1}$ is greater than or equal to 1.0 and less than or equal to 2.0 (i.e., $1.0 \leq n_{x1} \leq 2.0$). $n_{y1}$ is greater than or equal to 1.0 and less than or equal to 2.0 (i.e., $1.0 \leq n_{y1} \leq 2.0$), and $n_{z1}$ is greater than or equal to 1.0 and less than or equal to 2.0 (i.e., $1.0 \leq n_{z1} \leq 2.0$). An in-plane retardation $R_o$ of the optical compensation layer 140 satisfy that $R_o = (n_{x1} - n_{y1}) \times d_1$, where $d_1$ is the thickness of the optical compensation layer 140. The in-plane retardation $R_o$ of the optical compensation layer 140 may be understood as an actual retardation of light passing through the optical compensation layer 140 in a normal direction (a direction perpendicular to the optical compensation layer 140).

Figure 6:
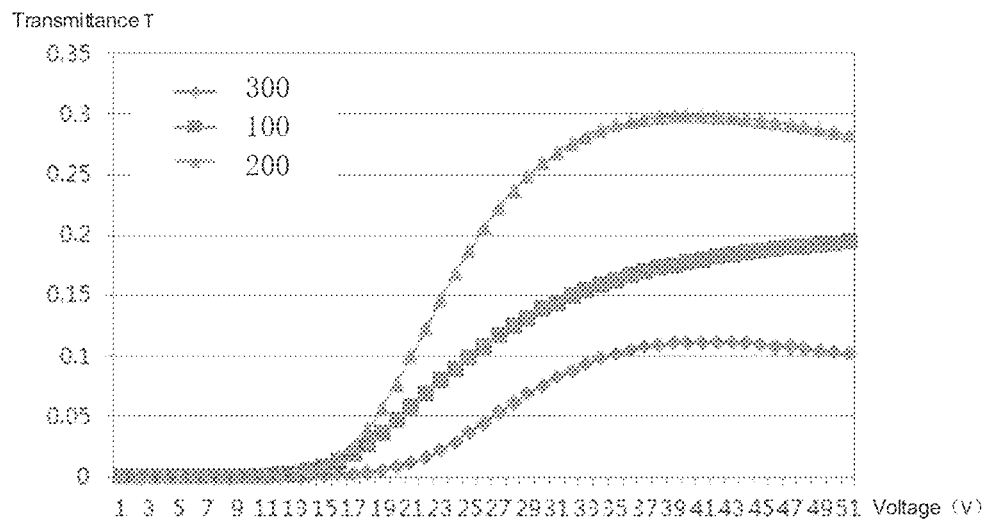
FIG. 6 is a schematic diagram of relationship curves each between operating voltage and transmittance of a liquid crystal display panel, in accordance with some embodiments.

An orthogonal projection of the optical axis of the optical compensation layer 140 on the first polarizer 110 is perpendicular to the orthogonal projection of the optical axis of the first liquid crystal molecule 130' on the first polarizer 110. That is, the orthogonal projection of the optical axis of the optical compensation layer 140 on the first polarizer 110 is perpendicular to the orthogonal projection of the optical axis of the first liquid crystal molecule 130' on the first polarizer 110 in the initial state. It may also be said that the orthogonal projection of the optical axis of the optical compensation layer 140 on the first polarizer 110 is perpendicular to the alignment direction of the first alignment film 10. As described above, since the thickness of the first liquid crystal layer 130 is small, the rotation angle of the liquid crystal molecule with the largest rotation angle in the first liquid crystal layer 130 is less than 90° after the horizontal electric field is applied, so that the transmittance of the liquid crystal display panel is reduced. Since the orthogonal projection of the optical axis of the optical compensation layer 140 on the first polarizer 110 is perpendicular to the orthogonal projection of the optical axis of the first liquid crystal molecule 130' on the first polarizer 110, that is, an angle between the orthogonal projection of the optical axis of the optical compensation layer 140 on the first polarizer 110 and the orthogonal projection of the optical axis of the first liquid crystal molecule 130' on the first polarizer 110 in the initial state is 90°, after the voltages are applied, a light modulation effect of the optical compensation layer 140 is the same as a light modulation effect of the first liquid crystal molecule 130' rotated by 90°. In this way, the optical compensation layer 140 may compensate the first liquid crystal layer 130, and in turn, the transmittance of the liquid crystal display panel may be improved. For example, referring to FIG. 6, FIG. 6 shows curves of transmittance versus operating voltage of the liquid crystal display panel 100 provided by the embodiments of the present disclosure, the liquid crystal display panel 200 in the related art 1 shown in FIG. 2A, and the liquid crystal display panel 300 in the related art 2 shown in FIG. 2B. It will be seen by contrast that, the transmittance of the liquid crystal display panel 100 provided by the embodiments of the present disclosure is significantly improved compared with the transmittance of the liquid crystal display panel 300 with a reduced cell gap in the related art, and the compensation of transmittance may be realized.

Moreover, with continued reference to FIGS. 1A and 1B, in a case where the liquid crystal display panel is not applied with the voltages, the acute angle is formed between the orthogonal projection of the optical axis of the first liquid crystal molecule 130' in the first liquid crystal layer 130 on the first polarizer 110 and the transmission axis of the first polarizer 110, which may cause the liquid crystal display panel to have a light leakage problem in an L0 state. The L0 state refers to a state that the liquid crystal display panel is not applied with the voltages to be in a dark state while the backlight module provides light normally, and it may also be said that a state that the liquid crystal display panel displays a black picture. In a case where the liquid crystal display panel is in the L0 state, since the acute angle is formed between the orthogonal projection of the optical axis of the first liquid crystal molecule 130' in the first liquid crystal layer 130 on the first polarizer 110 and the transmission axis of the first polarizer 110, the first liquid crystal molecules 130' may change polarization state of light exiting from the first polarizer 110, so that polarization direction of the light passing through the first liquid crystal layer 130 is no longer perpendicular to the transmission axis of the second polarizer 170. As a result, at least portion of the light may exit through the second polarizer 170, which in turn cause the light leakage problem in the dark state of the liquid crystal display panel L0.

In a case where the liquid crystal display panel is not applied with the voltages, since the orthogonal projection of the optical axis of the optical compensation layer 140 on the first polarizer 110 is perpendicular to the orthogonal projection of the optical axis of the first liquid crystal molecule 130' on the first polarizer 110, and the optical compensation layer 140 has a phase retardation, the optical compensation layer 140 may offset at least a portion or all of phase retardation generated by the light passing through the first liquid crystal layer 130. In some embodiments, an absolute value of a difference between the in-plane retardation of the optical compensation layer 140 and the in-plane retardation of the first liquid crystal layer 130 is less than or equal to 30 nm. In this case, the optical compensation layer 140 may offset at least a portion of the phase retardation generated by the light passing through the first liquid crystal layer 130. In some other embodiments, the in-plane retardation of the optical compensation layer 140 is equal to the in-plane retardation of the first liquid crystal layer 130. In this case, the optical compensation layer 140 may completely offset the phase retardation generated by the light passing through the first liquid crystal layer 130. That is, in a case where no electric field is applied, a change of the phase retardation of the light exiting from the first polarizer 110 is 0 after passing through the first liquid crystal layer 130 and the optical compensation layer 140. In this way, after the light passes through the optical compensation layer 140 and the first liquid crystal layer 130, the polarization state of the light may be restored to the polarization state of the light exiting from the first polarizer 110. That is, the polarization direction of the light is perpendicular to the transmission axis of the second polarizer 170, so that the light cannot exit from the second polarizer 170 thereby solving the light leakage problem in the L0 dark state of the liquid crystal display panel as described above.

A type of the optical compensation layer 140 may be determined according to actual application requirements and/or process requirements, and will not be limited in the embodiments of the present disclosure. In some embodiments, the optical compensation layer 140 is an optical compensation layer based on a stretched polymer film. In some other embodiments, the optical compensation layer 140 is an optical compensation layer based on coated liquid crystal molecules. The polymer film before being stretched may be fabricated by solution casting or melt extrusion or any other film-forming technology known in the art, and the polymer film before being stretched may include a polystyrene film, a polynorbornene film, and the like. When the optical compensation layer 140 is fabricated, the required optical compensation layer 140 may be obtained by stretching the polymer film.

The optical compensation layer 140 may be disposed between the first polarizer 110 and the first liquid crystal layer 130, or between the second polarizer 170 and the first liquid crystal layer 130. In some embodiments, the liquid crystal display panel 100 may further include two base substrates, which are a first base substrate 120 (a substrate formed after the pixel electrodes and the common electrode(s) are disposed on the first base substrate 120 may also be referred to as an array substrate), and a second base substrate 160 (which may also be referred to as an opposite substrate). The liquid crystal display panel 100 may further include a color filter layer 60 disposed between the second base substrate 160 and the first liquid crystal layer 130. The optical compensation layer 140 may be disposed between the color filter layer 60 and the first liquid crystal layer 130.

In some possible implementation manners, the liquid crystal display panel 100 may further include a planarization layer, and the planarization layer is disposed on a side of the color filter layer proximate to the first liquid crystal layer 130, so that a side of the first liquid crystal layer 130 proximate to the color filter layer is flat, which may facilitate subsequent injection of the first liquid crystal molecules 130'. In some other possible implementation manners, the optical compensation layer 140 may be used as the planarization layer. The optical compensation layer 140, used as the planarization layer and disposed between the color filter layer and the first liquid crystal layer 130, may be used to fill in unevenness of a surface of the color filter layer. The optical compensation layer 140 is used as the planarization layer, which may simplify complexity of a process flow of the liquid crystal display panel 100, and is beneficial to saving manufacturing cost of the liquid crystal display panel 100.

Based on the above contents, on the basis of reducing the thickness of the first liquid crystal layer 130 to achieve a fast response, the liquid crystal display panel provided by the embodiments of the present disclosure adjust the angle of the optical axis of the first liquid crystal molecule 130' in the first liquid crystal layer 130 in a case of no voltages being applied, so that the acute angle γ is formed between the orthogonal projection of the optical axis of the first liquid crystal molecule 130' on the first polarizer 110 and the transmission axis of the first polarizer 110 in a case of no voltage being applied. As a result, the first liquid crystal molecule 130' may be rotated by a large angle relative to the transmission axis of the first polarizer 110 due to action of the electric field, and the compensation of the transmittance may be further achieved, thereby compensating for a loss of the transmittance caused by the decrease in the thickness of the first liquid crystal layer 130. Moreover, the optical compensation layer 140 is provided between the first polarizer 110 and the first liquid crystal layer 130 or between the second polarizer 170 and the first liquid crystal layer 130, and the orthogonal projection of the optical axis of the compensation layer 140 on the first polarizer 110 is perpendicular to the orthogonal projection of the optical axis of the first liquid crystal molecule 130' on the first polarizer 110. In this way, the transmittance of the liquid crystal display panel may be further improved, and in the L0 state, a portion or all of the phase retardation generated by the light passing through the first liquid crystal layer 130 may be offset, thereby solving the light leakage problem in the L0 dark state of the liquid crystal display panel. The liquid crystal display panel provided by the embodiments of the present disclosure may not only effectively improve the transmittance, but also achieve the fast response, and may correspondingly improve the contrast ratio of the liquid crystal display panel and display quality of the picture, which may enhance competitiveness of products, and meet use requirements of users. Moreover, preparation method is simple, materials are widely available and the cost is low, which is beneficial to control the manufacturing cost of the liquid crystal display panel. Referring to FIGS. 5 and 6, compared with the liquid crystal display panel 200 in the related art 1 shown in FIG. 2A and the liquid crystal display panel 300 in the related art 2 shown in FIG. 2B, it is obtained by simulation that in a case where the acute angle γ is 25°, the response time of the liquid crystal display panel 100 provided by the embodiments of the present disclosure is substantially 20 ms.

Response time of the liquid crystal display panel 300 may be reduced to 40% of response time of the liquid crystal display panel 200, while a problem that transmittance of the liquid crystal display panel 300 is reduced to 40% of transmittance of the liquid crystal display panel 200 follows. The liquid crystal display panel 100 provided by the embodiments of the present disclosure, compared with the liquid crystal display panel 300, may greatly improve properties thereof. The response time of the liquid crystal display panel 100 may be further reduced to 75% of the response time of the liquid crystal display panel 300, and the transmittance of the liquid crystal display panel 100 may be improved relative to the transmittance of the liquid crystal display panel 300, which increases to approximately 167% of the transmittance of the liquid crystal display panel 300, so as to achieve the compensation of the transmittance relative to the liquid crystal display panel 300.

Figure 7A:
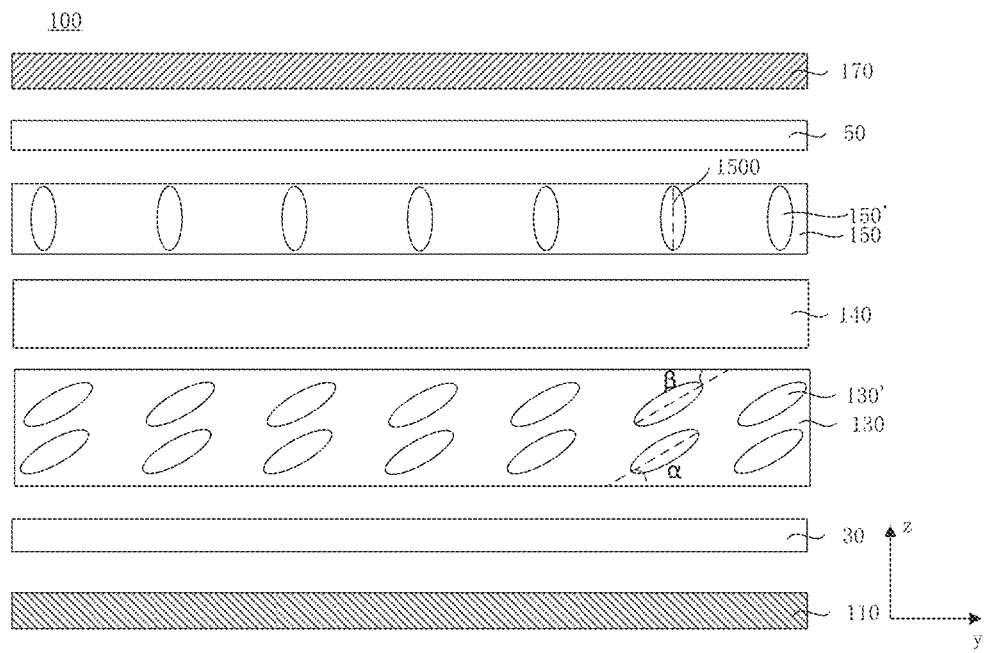
FIG. 7A is a structural diagram of a liquid crystal display panel, in accordance with some embodiments.
Figure 7B:
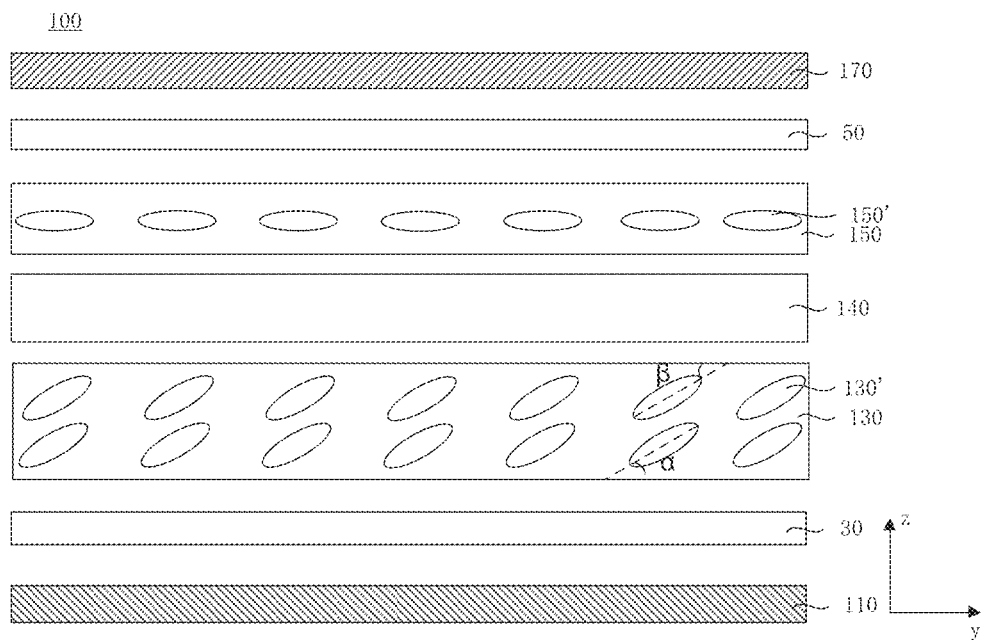
FIG. 7B is a structural diagram of a liquid crystal display panel, in accordance with some embodiments.

In order to further achieve the compensation of the transmittance of the liquid crystal display panel, in some embodiments, referring to FIGS. 7A and 7B, the liquid crystal display panel 100 provided by the embodiments of the present disclosure may further include a second liquid crystal layer 150. The second liquid crystal layer 150 may be disposed between the first polarizer 110 and the first liquid crystal layer 130, or between the second polarizer 170 and the first liquid crystal layer 130.

The second liquid crystal layer 150 includes second liquid crystal molecules 150'. In some embodiments, the second liquid crystal molecules 150' in the second liquid crystal layer 150 may be rod-like liquid crystal molecules, and long axis directions thereof are optical axis directions. In addition, the second liquid crystal molecules 150' in the second liquid crystal layer 150 may be positive liquid crystal molecules or negative liquid crystal molecules, which will not be limited in the embodiments of the present disclosure. The second liquid crystal molecules 150' may be nematic liquid crystal molecules or cholesteric liquid crystal molecules.

Based on this, the liquid crystal display panel 100 may further include first control electrode(s) 30 and second control electrode(s) 50. The first control electrode(s) 30 and the second control electrode(s) 50 are configured to control the optical axes 1500 of the second liquid crystal molecules 150' in the second liquid crystal layer 150 to deflect. The first control electrode(s) 30 are disposed between the first polarizer 110 and the second liquid crystal layer 150, and the second control electrode(s) 50 are disposed between the second polarizer 170 and the second liquid crystal layer 150. Orthogonal projection(s) of the first control electrode(s) 30 on the first polarizer 110 and orthogonal projection(s) of the second control electrode(s) 50 on the first polarizer 110 have overlapping region(s), so that a vertical electric field may be generated in the second liquid crystal layer 150 through the first control electrode(s) 30 and the second control electrode(s) 50. The first control eledrode(s) 30 and the second control electrode(s) 50 may take three configuration manners as follows.

(1) The liquid crystal display panel includes one second control electrode and one first control electrode, and an opposite portion of the second control electrode and the first control electrode may correspond to a plurality of pixels. For example, the second control electrode and/or the first control electrode are whole layer of electrodes, and both the second control electrode and the first control electrode correspond to all pixels in the liquid crystal display panel. In this case, only two electrodes, that is, the first control electrode and the second control electrode, need to be provided with electrical signals, which may save signals, and the structure of the liquid crystal display panel may be relatively simple.

(2) The liquid crystal display panel includes one second control electrode and a plurality of first control electrodes, the second control electrode may correspond to a plurality of pixels, and each first control electrode is disposed in one-to-one correspondence with a pixel or a sub-pixel of the plurality of pixels (i.e., the plurality of pixels corresponding to the second control electrode) in the liquid crystal display panel. For example, the second control electrode is a whole layer of electrode, and the second control electrode corresponds to all pixels in the liquid crystal display panel; the plurality of first control electrodes are distributed in an array, and each first control electrode corresponds to a sub-pixel. In this way, the second liquid crystal layer corresponding to a pixel may be individually controlled by a first control electrode and the second control electrode, so that second liquid crystal molecules corresponding to the pixel are deflected.

(3) The liquid crystal display panel includes a plurality of second control electrodes and a plurality of first control electrodes, each second control electrode may correspond to one or more first control electrodes. Each second control electrode may correspond to one or more pixels, each first control electrode is disposed in one-to-one correspondence with a pixel or a sub-pixel of the one or more pixels (i.e. the one or more pixels corresponding to the second control electrode) in the liquid crystal display panel. For example, each second control electrode corresponds to first control electrodes, each second control electrode corresponds to a pixel. Accordingly, each second control electrode corresponds to sub-pixels (i.e., sub-pixels included in the pixel corresponding to the second control electrode), and each first control electrode corresponds to a sub-pixel. In this way, the second liquid crystal layer corresponding to the pixel may be individually controlled by the first control electrodes and the second control electrode, so that second liquid crystal molecules corresponding to the pixel are deflected.

Based on the above, the first control electrode(s) 30, the second control electrode(s) 50, and the second liquid crystal layer 150 may realize the following two functions.

First, referring to FIG. 7A, the liquid crystal display panel 100 may display the black picture. In this case, each pixel in the liquid crystal display panel 100 displays a black block (e.g. grayscale data of the pixel is R=0, G=0, B=0).

For pixels displaying black blocks in the liquid crystal display panel 100, optical axes of second liquid crystal molecules 150' corresponding to the pixels displaying black blocks in the liquid crystal display panel 100 are made perpendicular to the first polarizer 110 through at least one (e.g., one or more) first control electrode 30 and at least one (e.g., one or more) second control electrode 50 that are corresponding to the pixels. For example, since the orthogonal projection(s) of the first control electrode(s) 30 on the first polarizer 110 and the orthogonal projection(s) of the second control electrode(s) 50 on the first polarizer 110 have overlapping region(s), the first control electrode(s) 30 and the second control electrode(s) 50 may generate a vertical electric field in a portion of the second liquid crystal layer 150 corresponding to the pixels displaying the black blocks, thereby driving the optical axes of the second liquid crystal molecules 150' to be perpendicular to the first polarizer 110.

The optical axes of the second liquid crystal molecules 150' are perpendicular to the first polarizer 110, so that light may exit along the optical axes of the second liquid crystal molecules 150'. In this case, the second liquid crystal molecules 150' do not change the polarization state of the exiting light. Considering an example in which the second liquid crystal layer 150 is located between the first liquid crystal layer 130 and the second polarizer 170 and between the optical compensation layer 140 and the second polarizer 170, the light first passes through the first liquid crystal layer 130 and the optical compensation layer 140, and then passes through the second liquid crystal layer 150. Since the second liquid crystal molecules 150' do not change the polarization state of the exiting light, a polarization state of light exiting through the first liquid crystal layer 130 and the optical compensation layer 140 may not change after passing through the second liquid crystal molecules 150. This means that in the liquid crystal display panel 100, the second liquid crystal layer 150 will not affect the improvement effect of the optical compensation layer 140 on the light leakage problem at positions where the liquid crystal display panel displays black blocks.

In a case where all the pixels in the liquid crystal display panel 100 display the black block, the optical axes of the second liquid crystal molecules 150' corresponding to all the pixels in the liquid crystal display panel 100 may be made perpendicular to the first polarizer 110 by at least one (e.g., one or more) first control electrode 30 and at least one (e.g., one or more) second control electrode 50. Since all the pixels in the liquid crystal display panel 100 display the black block, and the optical axes of the second liquid crystal molecules 150' corresponding to all the pixels in the liquid crystal display panel 100 are perpendicular to the first polarizer 110, in a case where the liquid crystal display panel 100 displays the black picture, that is, in the L0 state, the second liquid crystal layer 150 will not affect the improvement effect of the optical compensation layer 140 on the light leakage problem of the liquid crystal display panel in the L0 state.

Figure 7C:
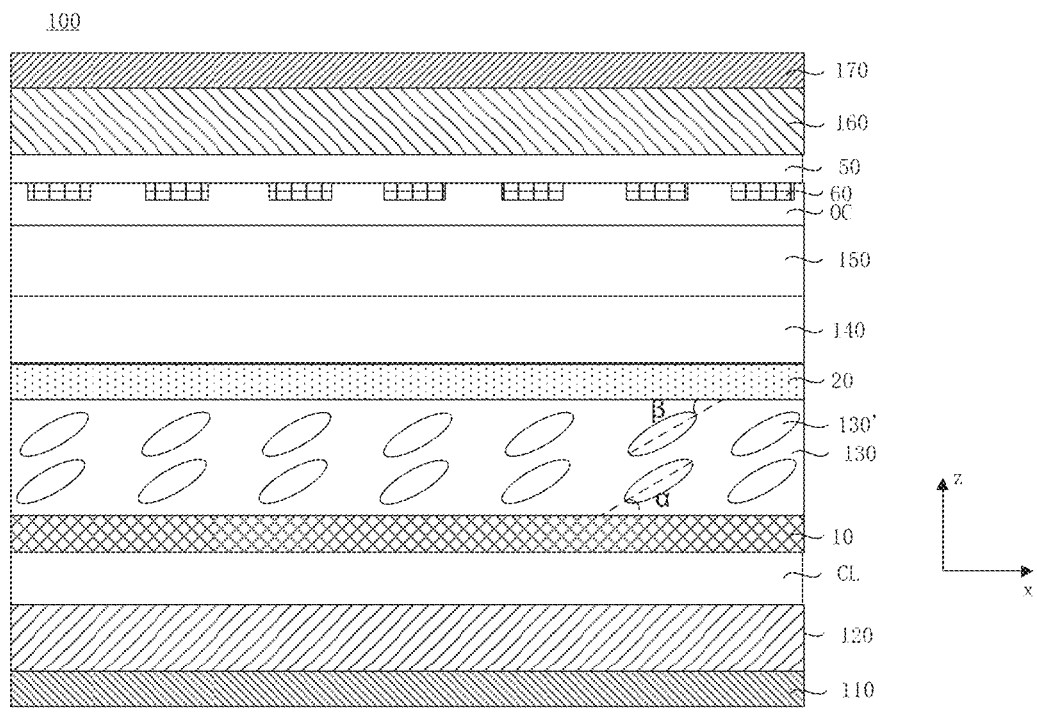
FIG. 7C is a structural diagram of a liquid crystal display panel, in accordance with some embodiments.

Second, referring to FIG. 7C, the liquid crystal display panel 100 may also display a non-black picture. In a case where the liquid crystal display panel 100 displays the non-black picture, display states of all pixels in the liquid crystal display panel 100 may be divided into the following two cases.

(1) All the pixels in the liquid crystal display panel 100 display non-black blocks (e.g. grayscale data of the pixel displaying the non-black block is that at least one of R, G, and B is not equal to zero).

(2) Some pixels in the liquid crystal display panel 100 display non-black blocks, and other pixels display black blocks.

For pixels displaying non-black blocks in the liquid crystal display panel 100, orthogonal projections of the optical axes of the second liquid crystal molecules 150' corresponding to the pixels displaying the non-black blocks on the first polarizer 110 may be parallel to the orthogonal projection of the optical axis of the optical compensation layer 140 on the first polarizer 110 through at least one (e.g., one or more) first control electrode 30 and at least one (e.g., one or more) second control electrode 50. For example, the optical axes of the second liquid crystal molecules 150' corresponding to the pixels displaying the non-black blocks in the liquid crystal display panel 100 may be parallel or approximately parallel to a plane where the second liquid crystal layer 150 is located, and the orthogonal projections of the optical axes of the second liquid crystal molecules 150' on the first polarizer 110 are parallel to the orthogonal projection of the optical axis of the optical compensation layer 140 on the first polarizer 110.

In some possible implementation manners, the electric field may be applied to a portion of the second liquid crystal layer 150 corresponding to an opposite portion of the at least one first control electrode 30 and the at least one second control electrode 50 through the at least one first control electrode 30 and the at least one second control electrode 50, and an electric field direction of the electric field is parallel to the optical axis direction of the optical compensation layer 140, so that the optical axes of the second liquid crystal molecules 150' are deflected due to the electric field, and in turn, the orthogonal projections of the optical axes of the second liquid crystal molecules 150' on the first polarizer 110 are parallel to the orthogonal projection of the optical axis of the optical compensation layer 140 on the first polarizer 110. For another example, the second liquid crystal layer 150 may also be in contact with an alignment film. By setting the alignment direction of the alignment film, it is possible to make the orthogonal projections of the optical axes of the second liquid crystal molecules 150' on the first polarizer 110 parallel to the orthogonal projection of the optical axis of the optical compensation layer 140 on the first polarizer 110 in the initial state where there is no electric field in the second liquid crystal layer 150. Based on this, the above vertical electric field may be turned off by the at least one first control electrode 30 and the at least one second control electrode 50, so that there is no electric field in the portion of the second liquid crystal layer 150 corresponding to the opposite portion of the at least one first control electrode 30 and the at least one second control electrode 50, and in turn, the second liquid crystal molecules 150' in corresponding portion are caused to return to a state where the orthogonal projections of the optical axes of the second liquid crystal molecules 150' on the first polarizer 110 are parallel to the orthogonal projection of the optical axis of the optical compensation layer 140 on the first polarizer 110 due to the alignment film.

Since the orthogonal projections of the optical axes of the second liquid crystal molecules 150' corresponding to the pixels displaying the non-black blocks on the first polarizer 110 are parallel to the orthogonal projection of the optical axis of the optical compensation layer 140 on the first polarizer 110, for a portion of the second liquid crystal layer 150 corresponding to the pixels displaying the non-black blocks, a refractive index may satisfy that $n_{x2}$ is greater than $n_{y2}$ and $n_{y2}$ is approximately equal to $n_{z2}$ (i.e., $n_{x2} > n_{y2} \sim n_{z2}$), or $n_{x2}$ is greater than $n_{y2}$ and $n_{y2}$ is equal to $n_{z2}$ (i.e., $n_{x2} > n_{y2} = n_{z2}$), where $n_{x2}$ is a refractive index of the second liquid crystal layer 150 in a direction of $X_2$-axis in a plane of the second liquid crystal layer 150, $n_{y2}$ is a refractive index of the second liquid crystal layer 150 in a direction of $Y_2$-axis perpendicular to the $X_2$ axis in the plane of the second liquid crystal layer 150, and $n_{z2}$ is a refractive index of the second liquid crystal layer 150 in a thickness direction of the second liquid crystal layer 150. The $X_2$ axis is an optical axis of the portion of the second liquid crystal layer 150 corresponding to the pixels displaying the non-black blocks, Since the second liquid crystal molecules 150' corresponding to the pixels displaying the non-black blocks have a uniform arrangement, it may be considered that $X_2$ axis is the optical axis of these second liquid crystal molecules 150'. Further, an in-plane retardation $R_o$ of the portion of the second liquid crystal layer 150 corresponding to the pixels displaying the non-black blocks satisfies that $R_o = (n_{x2} - n_{y2}) \times d_2$, where $d_2$ is the thickness of the second liquid crystal layer 150. The in-plane retardation of the portion of the second liquid crystal layer 150 can be understood as an actual retardation of light passing through the second liquid crystal layer 150 in a normal direction (a direction perpendicular to the second liquid crystal layer 150). In this case, it may be considered that the portion of the second liquid crystal layer 150 corresponding to the pixels displaying the non-black blocks is the +A compensation layer, and an orthogonal projection of an optical axis of the +A compensation layer on the first polarizer 110 is parallel to the orthogonal projection of the optical axis of the optical compensation layer 140 on the first polarizer 110. In this way, in a case where the liquid crystal display panel 100 displays the non-black picture, a function of the portion of the second liquid crystal layer 150 corresponding to the pixels displaying the non-black blocks is similar to a function of the optical compensation layer 140, and compensation of transmittance of a portion of the liquid crystal display panel 100 corresponding to the pixels displaying the non-black blocks may be further achieved on a basis of the optical compensation layer 140.

In some embodiments, the in-plane retardation of the portion of the liquid crystal layer 150 corresponding to the pixels displaying the non-black blocks is in a range of 120 nm to 280 nm, inclusive. For example, the in-plane retardation of the portion of the second liquid crystal layer 150 corresponding to the pixels displaying the non-black blocks is 120 nm, 150 nm, 200 nm, or 280 nm. Since the portion of the second liquid crystal layer 150 corresponding to the pixels displaying the non-black blocks has the above-mentioned in-plane retardation, the portion of the second liquid crystal layer 150 corresponding to the pixels displaying the non-black blocks may achieve the compensation of the transmittance of the portion of the liquid crystal display panel 100 corresponding to the pixels displaying the non-black blocks. Referring to FIG. 10, a scheme 1, a scheme 2, and a scheme 3 respectively correspond to cases where the in-plane retardation of the second liquid crystal layer 150 in the liquid crystal display panel 100 provided by the embodiments of the present disclosure is 120 nm, 175 nm and 247 nm. It will be seen that in the case where the in-plane retardation of the second liquid crystal layer 150 is 120 nm, 175 nm, and 247 nm, the liquid crystal display panel 100 provided by the embodiments of the present disclosure may have relatively short response time and relatively high transmittance. For example, the in-plane retardation of the second liquid crystal layer 150 is in a range of a difference between 247 nm and 20 nm to a sum of 247 nm and 20 nm, inclusive (i.e., 247 nm±20 nm), that is, the range is 227 nm to 267 nm, inclusive (i.e., [227 nm, 267 nm]). For example, the in-plane retardation of the second liquid crystal layer 150 is in a range of a difference between 247 nm and 15 nm to a sum of 247 nm and 15 nm, inclusive (i.e., 247 nm±15 nm), in a range of a difference between 247 nm and 10 nm to a sum of 247 nm and 10 nm, inclusive (i.e., 247 nm±10 nm), or in a range of a difference between 247 nm and 5 nm to a sum of 247 nm and 5 nm, inclusive (i.e., 247 nm±5 nm) In this case, the transmittance of the liquid crystal display panel 100 may be further improved.

In some embodiments, the first control electrode(s) and the second control electrode(s) may be arranged as the configuration manner (1) described above. Since the liquid crystal display panel includes only one first control electrode and only one second control electrode, in a case where the liquid crystal display panel 100 displays the non-black picture, by the first control electrode and the second control electrode, the orthogonal projections of the optical axes of the second liquid crystal molecules 150' corresponding to all the pixels in the liquid crystal display panel 100 (i.e., the pixels displaying the black blocks and the pixels displaying the non-black blocks) on the first polarizer 110 may be made parallel to the orthogonal projection of the optical axis of the optical compensation layer 140 on the first polarizer 110. In this case, the second liquid crystal layer 150 may achieve the compensation of the transmittance of the portion of the liquid crystal display panel 100 corresponding to the pixels displaying the non-black blocks.

In some other embodiments, the first control electrodes) and the second control electrode(s) may be arranged as the configuration manner (2) or the configuration manner (3) described above. Since the first control electrodes and the second control electrode(s) have these configurations, a portion of the second liquid crystal layer corresponding to a pixel may be individually controlled by the first control electrodes and the second control electrode(s), so that second liquid crystal molecules corresponding to the pixel are deflected. For example, in a case where the liquid crystal display panel 100 displays the non-black picture, for the pixels displaying the black blocks, by corresponding first control electrodes and corresponding second control electrode(s) (i.e.

first control electrodes and second control electrode(s) corresponding to the pixels displaying the black blocks), the optical axes of the second liquid crystal molecules 150' corresponding to the pixels displaying the black blocks are perpendicular to the first polarizer, so that the second liquid crystal layer 150 may perform light leakage compensation on the portion of the liquid crystal display panel corresponding to the pixels displaying the black blocks; for the pixels displaying the non-black blocks, by corresponding first control electrodes and corresponding second control electrode(s) (i.e. first control electrodes and second control electrode(s) corresponding to the pixels displaying the non-black blocks), the orthogonal projections of the optical axes of the second liquid crystal molecules 150' corresponding to the pixels displaying the non-black blocks on the first polarizer are parallel to the orthogonal projection of the optical axis of the optical compensation layer 140 on the first polarizer 110, so that the second liquid crystal layer 150 may achieve the compensation of the transmittance of the portion of the liquid crystal display panel corresponding to the pixels displaying the non-black blocks. In this way, the display effect of the liquid crystal display panel when displaying the non-black picture may be further improved.

In some embodiments, the second liquid crystal layer 150 is a polymer dispersed liquid crystal layer. The polymer dispersed liquid crystal layer is a composite film layer in which polymer and liquid crystal are mixed in a certain ratio and subjected to phase separation, for example, using an ultraviolet curing phase separation technique or a thermal curing phase separation technique, so that the liquid crystal is precipitated from the polymer to form droplets, and the polymer cures to encapsulate the liquid crystal droplets therein. Since a structure of the polymer dispersed liquid crystal layer is a structure of the cured polymer matrix encapsulating the flowable liquid crystal therein, there is no need to encapsulate the liquid crystal. Compared with a liquid crystal layer that needs to be encapsulated, the polymer dispersed liquid crystal layer may have a relatively simpler structure and thinner thickness.

In the polymer dispersed liquid crystal layer, the liquid crystal may be nematic liquid crystal or cholesteric liquid crystal. The polymer dispersed liquid crystal layer may have two states: in a case of the voltages being applied to the polymer dispersed liquid crystal layer, among the liquid crystal droplets in the polymer dispersed liquid crystal layer, liquid crystal molecules may be deflected due to the action of the electric field, so that optical axes of the liquid crystal molecules are parallel to the electric field direction; and in a case of no electric field existing in the polymer dispersed liquid crystal layer, the optical axes of the liquid crystal molecules among the liquid crystal droplets may be parallel to any direction, so that the polymer dispersed liquid crystal layer is in a scattering state.

In some possible implementation manners, the second liquid crystal layer 150 is a polymer dispersed bistable nematic liquid crystal layer. In a case where the liquid crystal in the polymer dispersed liquid crystal layer is bistable nematic liquid crystal, the polymer dispersed liquid crystal layer may be referred to as the polymer dispersed bistable nematic liquid crystal layer.

The polymer matrix in the polymer dispersed bistable nematic liquid crystal layer may align liquid crystal molecules therein. For example, the polymer matrix may form a polymer network to play a role of aligning the liquid crystal molecules therein, so that the liquid crystal molecules in the polymer dispersed bistable nematic liquid crystal layer may be in a certain alignment state after the liquid crystal molecules are subjected to the action of the electric field (e.g., removing the electric field quickly). Moreover, due to properties of the polymer dispersed liquid crystal layer itself, in a case where there is no electric field, directors of all liquid crystal droplets in the polymer dispersed liquid crystal layer may be arranged arbitrarily, so that the polymer dispersed liquid crystal layer is in the scattering state. Due to the properties of the polymer dispersed bistable nematic liquid crystal layer, the polymer dispersed bistable nematic liquid crystal layer may have a first stable state and a second stable state. That is, the polymer dispersed bistable nematic liquid crystal layer may maintain the first stable state and the second stable state in a case of no electric field being applied. In a case where the second liquid crystal layer 150 (i.e., the polymer bistable nematic liquid crystal layer) is in the first stable state, the orthogonal projections of the optical axes of the second liquid crystal molecules 150' on the first polarizer 110 are parallel to the orthogonal projection of the optical axis of the optical compensation layer 140 on the first polarizer 110. In a case where the second liquid crystal layer 150 (i.e., the polymer bistable nematic liquid crystal layer) is in the second stable state, the second liquid crystal layer 150 (i.e., the polymer bistable nematic liquid crystal layer) is in the scattering state. In a case where there is an electric field in the polymer dispersed bistable nematic liquid crystal layer, the optical axes of the liquid crystal molecules in the polymer dispersed bistable nematic liquid crystal layer may be parallel to the electric field direction of the electric field. For example, in a case where there is an electric field perpendicular to the liquid crystal layer in the polymer dispersed bistable nematic liquid crystal layer, the optical axes of the liquid crystal molecules in the liquid crystal layer may be parallel to the electric field direction of the vertical electric field. That is, the optical axes of the liquid crystal molecules may be perpendicular to the liquid crystal layer.

Figure 8A:
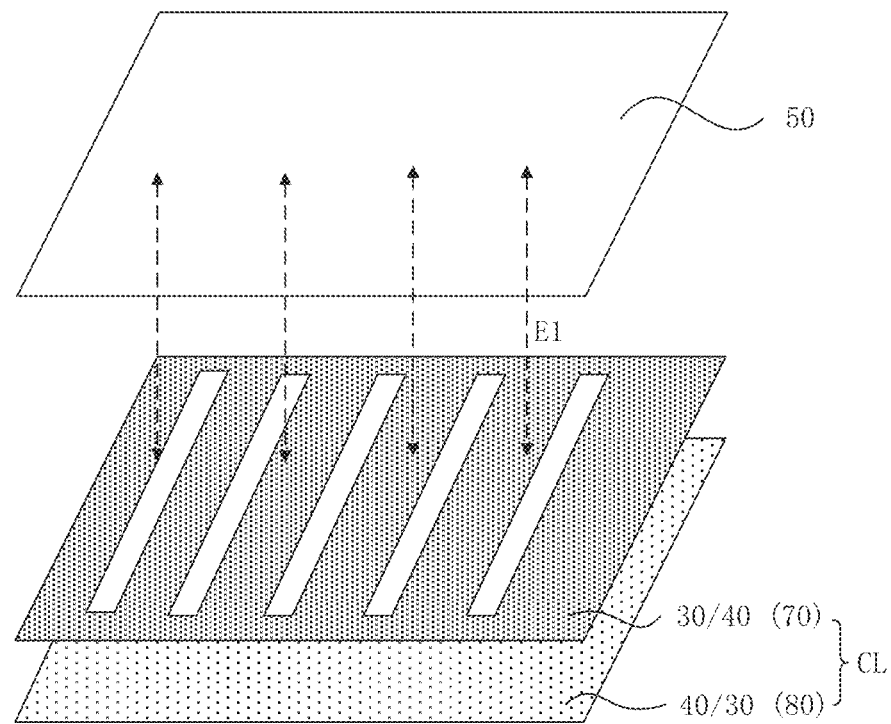
FIG. 8A is a structural diagram of a first control electrode, a second control electrode, and a third control electrode in a liquid crystal display panel, in accordance with some embodiments.
Figure 8B:
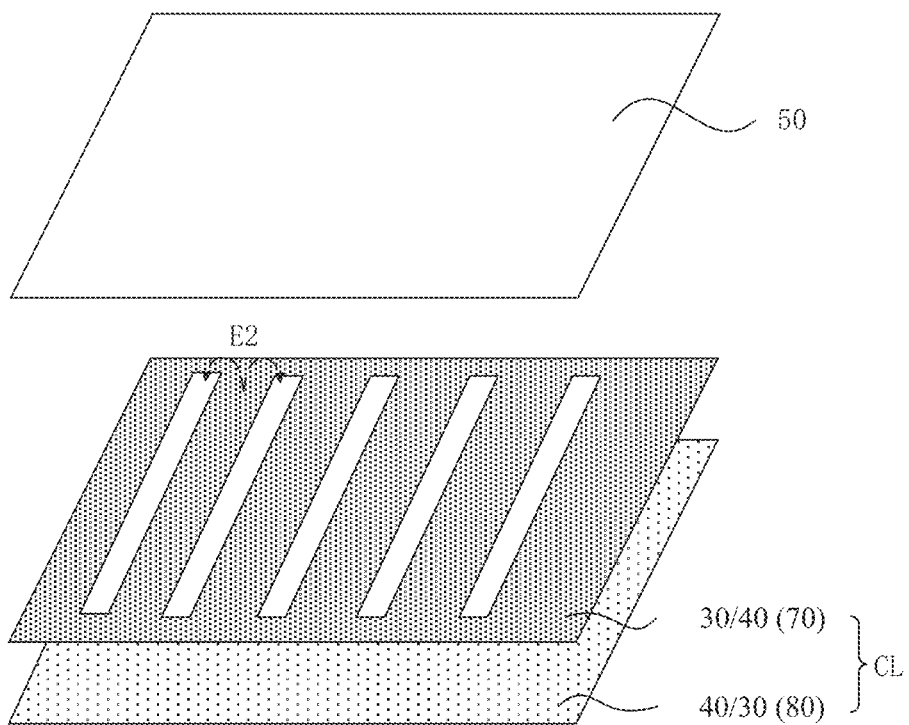
FIG. 8B is a structural diagram of a first control electrode, a second control electrode, and a third control electrode in another liquid crystal display panel, in accordance with some embodiments.
Figure 8C:
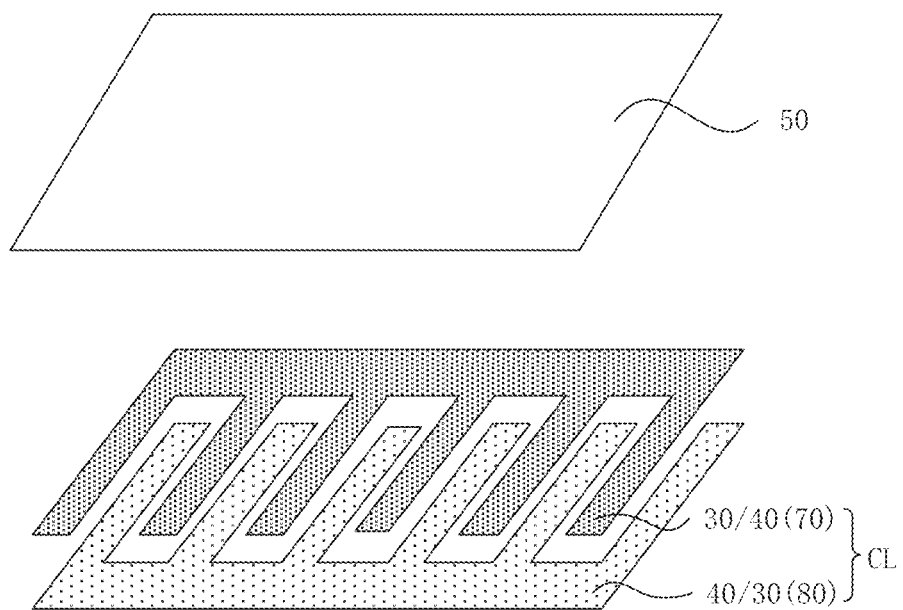
FIG. 8C is a structural diagram of a first control electrode, a second control electrode, and a third control electrode in yet another liquid crystal display panel, in accordance with some embodiments.

FIG. 7C shows the structure of the liquid crystal display panel in some embodiments of the present disclosure. The liquid crystal display panel 100 may further include a circuit layer CL. As shown in FIGS. 8A to 8C, the circuit layer CL may include the first control electrode(s) 30 described above, and the circuit layer CL may further include third control electrode(s) 40. The first control electrode(s) 30 and the third control electrode(s) 40 may be disposed on the first base substrate 120, and the third control electrode(s) 40 and the first control electrode(s) 30 are all disposed between the first liquid crystal layer 130 and the first polarizer 110. One of the third control electrode(s) 40 and the first control electrode(s) 30 are the pixel electrode(s) 70, and the other thereof are the common electrode(s) 80. In some possible implementation manners, a first control electrode 30 may be a pixel electrode, and correspondingly, a third control electrode 40 is a common electrode. In some other possible implementation manners, the first control electrode 30 may be the common electrode, and correspondingly, the third control electrode 40 is the pixel electrode. The embodiments of the present disclosure do not limit shapes of the first control electrode 30 and the third control electrode 40. For example, the shapes of the first control electrode 30 and the third control electrode 40 may be as shown in FIGS. 8A to 8C. Referring to FIG. 8C, the first control electrode 30 and the third control electrode 40 may have comb-like structures. For example, the first control electrode 30 and the third control electrode 40 both have a comb-like structure. In this case, the first control electrode 30 and the third control electrode 40 may be disposed in a same layer, so that the thickness of the liquid crystal display panel 100 may be further controlled.

Referring to FIGS. 7C and 8B, the third control electrode 40 and the first control electrode 30 may generate a horizontal electric field therebetween. For example, the horizontal electric field may be generated in the first liquid crystal layer 130, so as to make the first liquid crystal molecules 130' deflected, and in turn, the liquid crystal display panel may display pictures.

Referring to FIGS. 7C and 8A, the second control electrode 50 and the first control electrode 30 may generate a vertical electric field E1 therebetween. As described above, since the vertical electric field E1 may be generated between the second control electrode 50 and the first control electrode 30, the vertical electric field E1 may be generated in the second liquid crystal layer 150, and then the optical axes of the second liquid crystal molecules 150' may be perpendicular to the first polarizer 110. In some embodiments, the second liquid crystal molecules 150' are negative liquid crystal molecules and therefore the second liquid crystal molecules 150' will not be deflected due to the action of the vertical electric field. In this way, in a case where the vertical electric field exists in the second liquid crystal molecules 150', the second liquid crystal molecules 150' are not deflected, and the liquid crystal display panel may display the black picture.

Figure 8D:
FIG. 8D is a structural diagram of first control electrodes, a second control electrode, and third control electrodes in yet another liquid crystal display panel, in accordance with some embodiments.
Figure 8D:
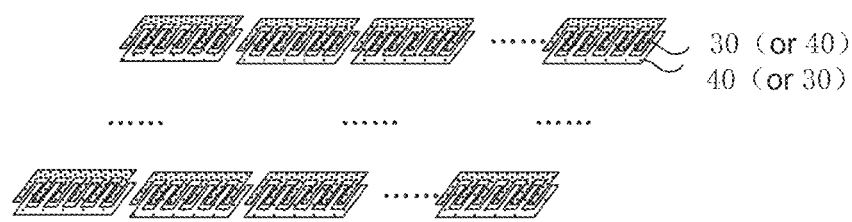
Figure 8E:
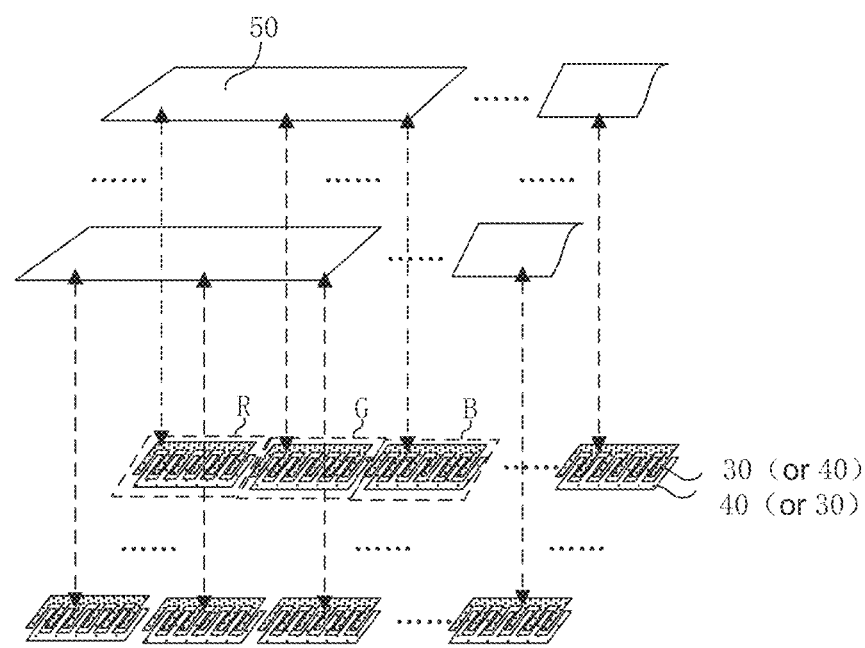
FIG. 8E is a structural diagram of first control electrodes, second control electrodes, and third control electrodes in yet another liquid crystal display panel, in accordance with some embodiments.

Further, as described above, in some embodiments, in the liquid crystal display panel, one first control electrode and/or one second control electrode may correspond to the plurality of pixels. For example, the liquid crystal display panel includes the whole layer of first control electrode and/or the whole layer of second control electrode that are corresponding to all the pixels in the liquid crystal display panel. In this case, referring to FIG. 8D, in the liquid crystal display panel 100 the first control electrodes 30, the second control electrode 50, and the third control electrodes 40 may have structures shown in FIG. 8D, and the second control electrode 50 may be the whole layer of electrode. In some other embodiments, portions of the second liquid crystal layer corresponding to different pixels in the liquid crystal display panel may each have a respective first control electrode and/or a respective second control electrode. For example, the liquid crystal display panel may include a plurality of first control electrodes and/or a plurality of second control electrodes, and each first control electrode and/or each second control electrode may correspond to a pixel. In this way, a portion of the second liquid crystal layer corresponding to the pixel may be individually controlled by the first control electrode and the second control electrode, so that the second liquid crystal molecules corresponding to the pixel are deflected. In this case, referring to FIG. 8E, in the liquid crystal display panel 100, the first control electrodes 30, the second control electrodes 50, and the third control electrodes 40 may have structures shown in FIG. 8E. Each second control electrode 50 may correspond to a pixel, and the pixel includes sub-pixels of three primary colors, such as a red (R) sub-pixel, a green (G) sub-pixel, and a blue (B) sub-pixel. Each first control electrode 30 and each third control electrode 40 may correspond to a sub-pixel. FIG. 8E shows a first control electrode and a third control electrode that are corresponding to a R sub-pixel, which is denoted as R, a first control electrode and a third control electrode that are corresponding to a G sub-pixel, which is denoted as G, and a first control electrode and a third control electrode that are corresponding to a B sub-pixel, which is denoted as B. Accordingly, each second control electrode 50 may correspond to the R, the G, and the B, that is, correspond to three first control electrodes and three third control electrodes.

The first control electrode(s) 30 may serve as the pixel electrode(s) or the common electrode(s), and may further serve as electrode(s) for controlling the second liquid crystal layer 150. Therefore, the first control electrode(s) 30, the second control electrode(s) 50, and the third control electrode(s) 40 may not only control the deflection of the first liquid crystal molecules 130' in the first liquid crystal layer 130, but also control the deflection of the second liquid crystal molecules 150' in the second liquid crystal layer 150. In this way, the liquid crystal display panel in the embodiments of the present disclosure has a simple structure compared with a case where the pixel electrodes and the common electrode(s) are provided for the first liquid crystal layer 130 and two types of control electrodes are provided for the second liquid crystal layer 150.

With continued reference to FIGS. 7C, and 8A to 8C, the third control electrode 40 and the first control electrode 30 may be disposed between the first liquid crystal layer 130 and the first polarizer 110, and the second control electrode 50 may be disposed between the second liquid crystal layer 150 and the second polarizer 170. In addition, the second liquid crystal layer 150 may be disposed between the first liquid crystal layer 130 and the second polarizer 170. In this way, the first liquid crystal layer 130 is closer to the first control electrode 30 and the third control electrode 40 than the second liquid crystal layer 150, so that the horizontal electric field generated by the pixel electrode and the common electrode may act well in the first liquid crystal layer 130, thereby complete the normal display of the liquid crystal display panel 100a, and effect of the horizontal electric field on the second liquid crystal layer 150 may also be reduced. In addition, since the second liquid crystal layer 150 is disposed between the first liquid crystal layer 130 and the second polarizer 170, the second liquid crystal layer 150 may be disposed on the second base substrate 160 when the liquid crystal display panel 100 is manufactured, and a cell aligning process is performed subsequently. In this way, in terms of process, the manufacture of the liquid crystal display panel 100 is relatively simple.

In addition, a material of the second control electrode(s) 50 may be indium tin oxide (ITO). The second control electrode(s) may be disposed on the second base substrate 160. Since a process of forming an ITO layer on the second base substrate 160 requires a relatively high temperature, the color filter layer 60 may be formed on the second base substrate 160 with the second control electrode(s) 50 (the ITO layer), and further a black matrix may be formed on the second base substrate 160 with the second control electrode(s) 50 (the ITO layer). In this way, damage of the color filter layer 60 and/or the black matrix due to the high temperature in the process of forming the ITO layer may be reduced compared with a case where the color filter layer 60 and/or the black matrix are formed on the second base substrate 160 firstly, and then the second control electrode(s) 50 (the ITO layer) are formed on the second base substrate 160 with the color filter layer 60 and/or the black matrix. Further, a planarization layer OC may be formed on the second base substrate 160 with the color filter layer 60, and then the second liquid crystal layer 150 and the optical compensation layer 140 may be formed.

Accordingly, the polymer dispersed bistable nematic liquid crystal layer (i.e., the second liquid crystal layer 150), the first control electrode(s) 30, the second control electrode(s) 50, and the third control electrode(s) 40 may realize the following three functions.

Figure 9A:
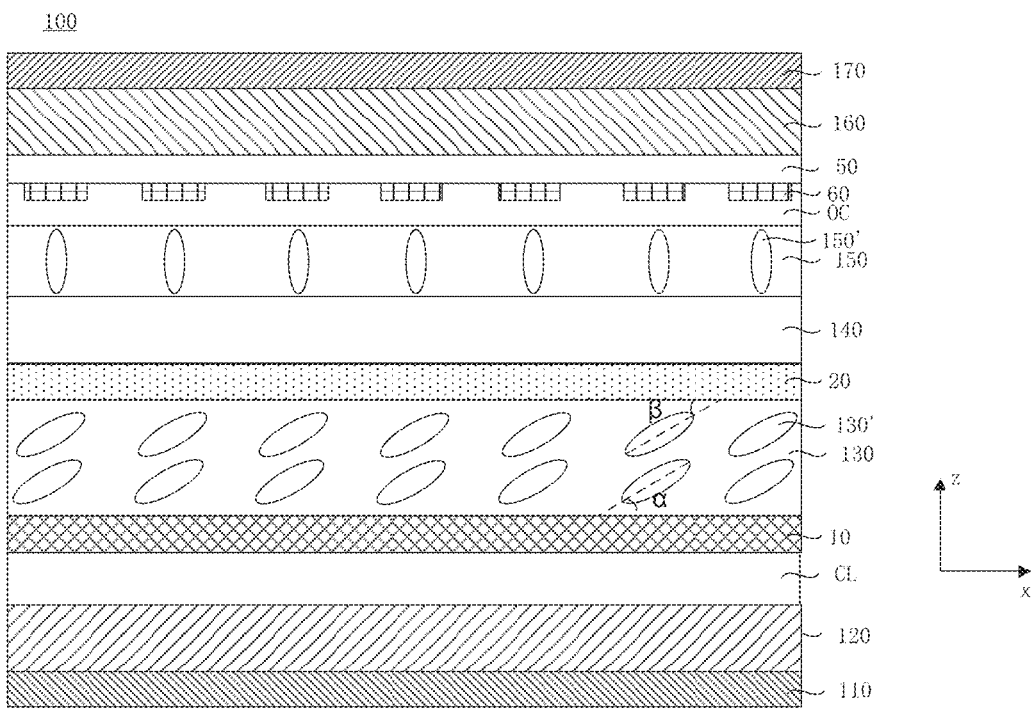
FIG. 9A is a structural diagram of a liquid crystal display panel, in accordance with some embodiments.

First, referring to FIG. 9A, in a case where the liquid crystal display panel 100 displays the black picture, by the first control electrode(s) 30, the second control electrode(s) 50, and the third control electrode(s) 40, a first vertical electric field may be applied to the second liquid crystal layer 150, so as to drive the second liquid crystal molecules 150' to make the optical axes thereof perpendicular to the first polarizer 110, that is, to drive the second liquid crystal molecules 150' to make the optical axes thereof perpendicular to the plane where the first polarizer 110 is located. In this case, as described above, since the optical axes of the second liquid crystal molecules 150' are perpendicular to the plane where the first polarizer 110 is located, the light may exit along the optical axis directions of the second liquid crystal molecules 150', and the second liquid crystal molecules 150' do not change the polarization state of the exiting light. In a case where the liquid crystal display panel 100 displays the black picture, that is, in the L0 state, the second liquid crystal layer 150 will not affect the improvement effect of the optical compensation layer 140 on the light leakage problem in the L0 state of the liquid crystal display panel.

Figure 9B:
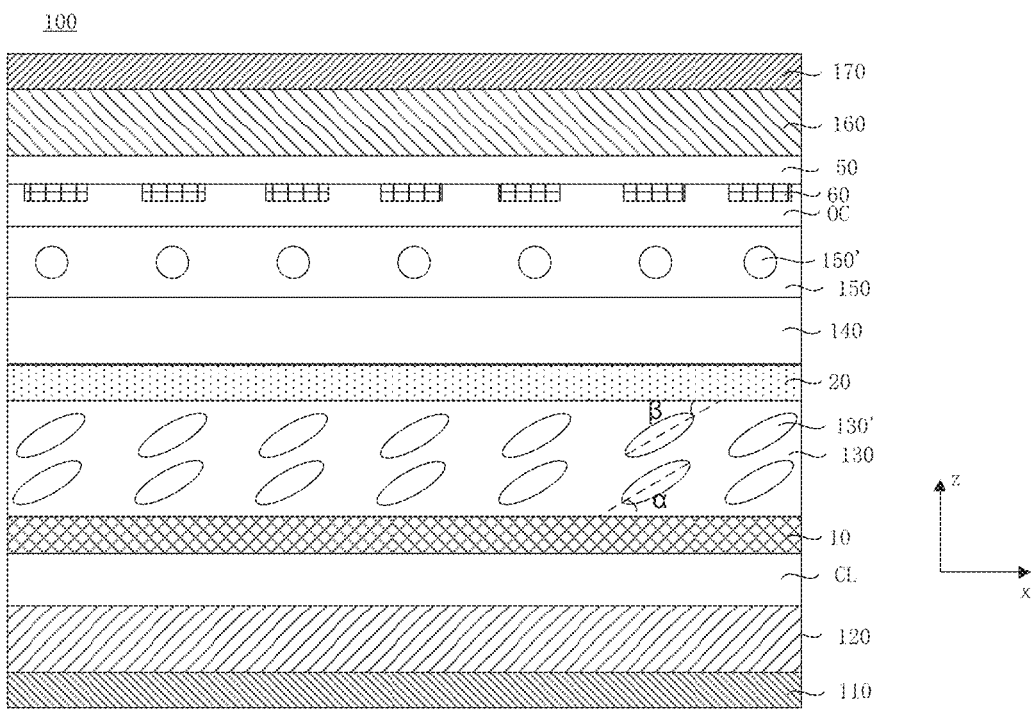
FIG. 9B is a structural diagram of a liquid crystal display panel, in accordance with some embodiments.
Figures 9C, 10:
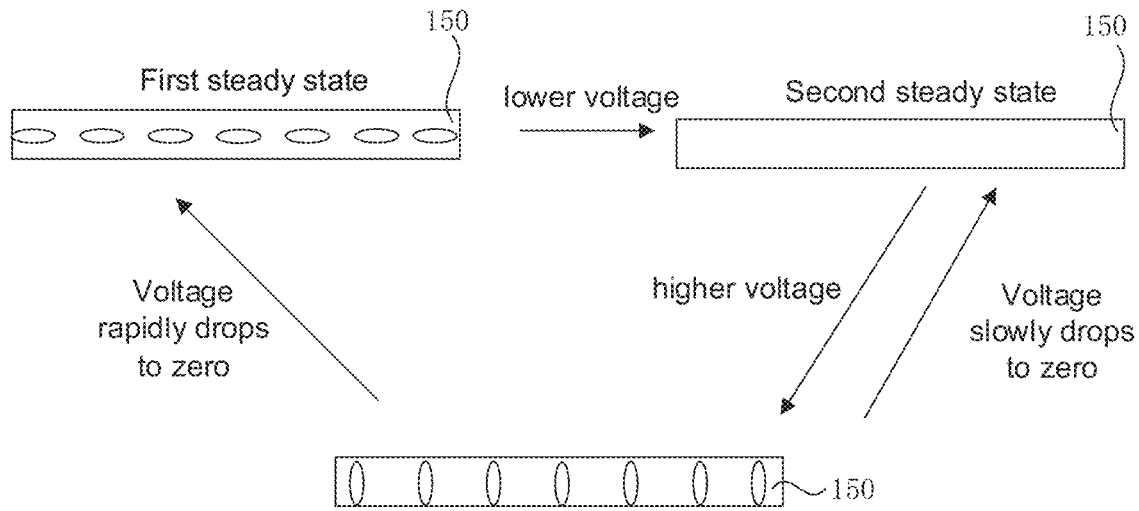
FIG. 9C is a schematic diagram of an operating state of a second liquid crystal layer in a liquid crystal display panel, in accordance with some embodiments.
FIG. 10 is a schematic diagram of test results of a liquid crystal display panel, in accordance with some embodiments.

Second, referring to FIG. 9B, in a case where the liquid crystal display panel 100 is converted from displaying the black picture to displaying the non-black picture, at least a part of pixels in the liquid crystal display panel 100 may be converted from displaying black blocks to displaying non-black blocks. Considering an example in which all the pixels in the liquid crystal display panel 100 are converted from displaying black blocks to displaying non-black blocks, the first vertical electric field may be withdrawn by the first control electrode(s) 30, the second control electrode(s) 50, and the third control electrode(s) 40. When the electric field applied to the second liquid crystal layer 150, that is, the polymer dispersed bistable nematic liquid crystal layer rapidly drops to zero, the second liquid crystal layer 150 may be in the first stable state. In this case, the orthogonal projections of the optical axes of the second liquid crystal olecules 150' on the first polarizer 110 are parallel to the orthogonal projection of the optical axis of the optical compensation layer 140 on the first polarizer 110. It will be noted that the orthogonal projections of the optical axes of the second liquid crystal molecules 150' on the first polarizer 110 shown in FIG. 9B are perpendicular to the x-direction and the z-direction, that is, the orthogonal projections of the optical axes of the second liquid crystal molecules 150' on the first polarizer 110 may be in a direction perpendicular to a plane of paper; the orthogonal projections of the optical axes of the first liquid crystal molecules 130' on the first polarizer 110 are parallel to the x-direction, and the orthogonal projection of the optical axis of the optical compensation layer 140 on the first polarizer 110 is perpendicular to the orthogonal projections of the optical axes of the first liquid crystal molecules 130' on the first polarizer 110, that is, the orthogonal projection of the optical axis of the optical compensation layer 140 on the first polarizer 110 is parallel to the orthogonal projections of the optical axes of the second liquid crystal molecules 150' on the first polarizer 110 in the direction perpendicular to the plane of paper. In this case, as described above, it may be considered that the second liquid crystal layer 150 is the +A compensation layer, and the orthogonal projection of the optical axis of the +A compensation layer on the first polarizer 110 is parallel to the orthogonal projection of the optical axis of the optical compensation layer 140 on the first polarizer 110. In this way, in a case where the liquid crystal display panel 100 displays the non-black picture, the function of the second liquid crystal layer 150 is similarly to the function of the optical compensation layer 140, and the compensation of the transmittance of the liquid crystal display panel 100 may be further achieved on the basis of the optical compensation layer 140.

It will be noted that, for a case where some pixels in the liquid crystal display panel 100 are converted from displaying black blocks to displaying non-black blocks, and the other pixels in the liquid crystal display panel 100 still display black blocks, the arrangement of the first control electrode(s), the second control electrode(s) and the third control electrode(s) may be adjusted, so that a portion of the second liquid crystal layer corresponding to the pixels which are converted from displaying the black blocks to displaying the non-black blocks is individually controlled by the first control electrode(s), the second control electrode(s) and the third control electrode(s), and the first vertical electric field in the portion of the second liquid crystal layer corresponding to the pixels which are converted from displaying the black blocks to displaying the non-black blocks is withdrawn, thereby achieving the above-mentioned functions.

Third, referring to FIG. 9O, in a case where the liquid crystal display panel is converted from displaying the non-black picture to displaying the black picture, at least a part of pixels in the liquid crystal display panel 100 may be converted from displaying non-black blocks to displaying black blocks. Considering an example in which all the pixels in the liquid crystal display panel 100 are converted from displaying non-black blocks to displaying black blocks, a second vertical electric field may be applied to the second liquid crystal layer 150, that is, the polymer dispersed bistable nematic liquid crystal layer by the first control electrode(s) 30, the second control electrode(s) 50 and the third control electrode(s) 40. An electric field intensity of the first vertical electric field is greater than an electric field intensity of the second vertical electric field. In this way, due to an action of low voltages, the second liquid crystal layer 150, that is, the polymer dispersed bistable nematic liquid crystal layer, may be in the second stable state, which may be the scattering state. Then, the first vertical electric field is applied to the second liquid crystal layer 150, that is, the polymer dispersed bistable nematic liquid crystal layer. In this way, the second liquid crystal layer 150, that is, the polymer dispersed bistable nematic liquid crystal layer, may be converted from the second stable state into a state where the optical axes of the second liquid crystal molecules 150' are perpendicular to the first polarizer by first applying the low voltages and then applying high voltages, and further converted from a state where the orthogonal projections of the optical axes of second liquid crystal molecules 150' on the first polarizer 110 are parallel to the orthogonal projection of the optical axis of the optical compensation layer 140 on the first polarizer 110 (i.e. the state where the second liquid crystal layer 150 is the +A compensation layer) to a state where the optical axes of the second liquid crystal molecules 150' are perpendicular to the plane where the first polarizer 110 is located. Further, purposes of the compensation of the transmittance of the liquid crystal display panel and solving the light leakage problem in the L0 state of the liquid crystal display panel may be achieved.

It will be noted that, for a case where some pixels in the liquid crystal display panel 100 are converted from displaying the non-black blocks to displaying the black blocks, and the other pixels in the liquid crystal display panel 100 still display black blocks, the arrangement of the first control electrode(s), the second control electrode(s) and the third control electrode(s) may be adjusted, so that a portion of the second liquid crystal layer corresponding to the pixels which are converted from displaying the non-black blocks to displaying the black blocks is individually controlled by the first control electrode(s), the second control electrode(s) and the third control electrode(s), and the second vertical electric field and/or the first vertical electric field is applied to the portion of the second liquid crystal layer corresponding to the pixels which are converted from displaying the non-black blocks to displaying the black blocks, thereby achieving the above functions.

Referring to FIG. 11 a scheme 4 corresponds to a case where the liquid crystal display panel 100 provided by the embodiments of the present disclosure includes the optical compensation layer but does not include the second liquid crystal layer, and a scheme 5 corresponds to a case where the liquid crystal display panel 100 provided by the embodiments of the present disclosure includes the optical compensation layer and the second liquid crystal layer. It will be seen that in a case where the liquid crystal display panel 100 includes the optical compensation layer and the second liquid crystal layer, the transmittance of the liquid crystal display panel 100 is relatively high, and the transmittance of the liquid crystal display panel 100 may reach a level of the transmittance of the liquid crystal display panel 200 shown in FIG. 2A, that is, a level of the transmittance of the liquid crystal display panel before the thickness of the first liquid crystal layer is reduced.

Some embodiments of the present disclosure further provide a driving method for a liquid crystal display panel, the liquid crystal display panel may be the liquid crystal display panel including the second liquid crystal layer provided in the above embodiments. That is, the driving method for the liquid crystal display panel provided by the embodiments of the present disclosure may be used for driving the liquid crystal display panel including the second liquid crystal layer.

Referring to FIG. 12, the driving method for the liquid crystal display panel includes the following steps.

In step 101 (S101), the liquid crystal display panel is driven to display the black picture, and the first vertical electric field is applied to the second liquid crystal layer through the first control electrode(s) and the second control electrode(s), so as to drive the optical axes of the second liquid crystal molecules in the second liquid crystal layer to be perpendicular to the first polarizer.

In some possible implementation manners, considering an example in which the liquid crystal display panel adopts the ADS mode, the liquid crystal display panel may include pixel electrodes and common electrodes of a plurality of sub-pixels, the common electrodes of the sub-pixels are coupled to each other, and may be applied with the same voltage Vcom. Driving the liquid crystal display panel to display the black picture may include: controlling voltages of a pixel electrode and a common electrode of each sub-pixel, for example, setting the pixel electrode and the common electrode of each sub-pixel to be at an equal voltage, so as to drive the first liquid crystal molecules in the first liquid crystal layer of the liquid crystal display panel not to deflect, so that the liquid crystal display panel displays the black picture.

In some possible implementation manners, applying the first vertical electric field to the second liquid crystal layer through the first control electrode(s) and the second control electrode(s) may include: setting a first control electrode and a second control electrode to be at unequal voltages, so that the first vertical electric field may be generated between a portion of the first control electrode directly opposite to the second control electrode and the second control electrode, and the optical axes of the second liquid crystal molecules in the vertical electric field are deflected through the first vertical electric field, which causes the optical axes of the second liquid crystal molecules to be perpendicular to the first polarizer.

In step 102 (S102), the liquid crystal display panel is driven to display the non-black picture, and the first vertical electric field is withdrawn, so that the orthogonal projections of the optical axes of the second liquid crystal molecules in the second liquid crystal layer on the first polarizer are parallel to the orthogonal projection of the optical axis of the optical compensation layer on the first polarizer.

In some possible implementation manners, considering an example in which the liquid crystal display panel adopts the ADS mode, the liquid crystal display panel may include pixel electrodes and common electrodes of the plurality of sub-pixels. Driving the liquid crystal display panel to display the non-black picture may include: controlling a voltage difference between the pixel electrode and the common electrode in each sub-pixel, so that at least one pixel in the liquid crystal display panel displays the non-black block. For example, the pixel electrode and the common electrode of at least one sub-pixel (e.g., one sub-pixel or three sub-pixels) in the pixels displaying non-black blocks are set to be at unequal voltages, and thus a horizontal electric field may be generated in the first liquid crystal layer corresponding to the sub-pixel through the pixel electrode and the common electrode, so that the first liquid crystal molecules therein are deflected, and thus the pixel may display the non-black block.

In some possible implementation manners, withdrawing the first vertical electric field may include: de-energizing the first control electrode(s) and/or the second control electrode (s), so that the first vertical electric field is withdrawn; alternatively, setting the first control electrode(s) and the second control electrode(s) to be at an equal voltage, so that the first vertical electric field is withdrawn.

In the driving method for the liquid crystal display panel provided by the embodiments of the present disclosure, an order of S101 and S102 is not limited. For example, S101 may be performed first, and then S102 may be performed; alternatively, S102 may be performed first, and then S102 may be performed. For another example, only S101 may be performed and S102 is not performed; alternatively, only S102 may be performed and S101 is not performed.

In some embodiments, the second liquid crystal layer is the polymer dispersed bistable nematic liquid crystal layer. The liquid crystal display panel includes the plurality of first control electrodes. The liquid crystal display panel may further include the third control electrode(s), and the first control electrodes and the third control electrode(s) are disposed between the first liquid crystal layer and the first polarizer. Each first control electrode may be the pixel electrode or the common electrode of each sub-pixel. The second control electrode(s) may be the whole layer of electrode. In this case, S101 may include the following steps.

In step 101a (S101a), the liquid crystal display panel is driven to convert from displaying the non-black picture to displaying the black picture.

In some possible implementation manners, a voltage difference between a first control electrode and a third control electrode (i.e., the pixel electrode and the common electrode) corresponding to each sub-pixel of all the pixels in the liquid crystal display panel may be controlled, for example, the first control electrode and the third control electrode are set to be at an equal voltage, so that the horizontal electric field cannot be generated between the first control electrode and the third control electrode, and the first liquid crystal molecules cannot be deflected, thereby enabling the liquid crystal display panel to display the black picture.

In step 101b (S101b), the second vertical electric field is applied to the second liquid crystal layer through the first control electrodes and the second control electrode, and the electric field intensity of the second vertical electric field is less than the electric field intensity of the first vertical electric field.

Due to an action of the weaker electric field, the second liquid crystal layer is in the second stable state. In a case where the second liquid crystal layer is in the second stable state, the directors of the liquid crystal droplets in the second liquid crystal layer may be arbitrary, so that the second liquid crystal layer in the second stable state is in the scattering state.

In some possible implementation manners, applying the second vertical electric field to the second liquid crystal layer through the first control electrodes and the second control electrode may include: setting a first control electrode and the second control electrode to be at unequal voltages, so that the second vertical electric field may be generated between the portion of the first control electrode directly opposite to the second control electrode and the second control electrode.

In step 101c (S101c), further, the first vertical electric field is applied to the second liquid crystal layer through the first control electrodes and the second control electrode.

Since the electric field intensity of the first vertical electric field is greater than the electric field intensity of the second vertical electric field, due to an action of the stronger electric field, the second liquid crystal layer is converted from the second steady state, that is, the scattering state, to a state where the optical axes of the second liquid crystal molecules are perpendicular to the first polarizer.

In the above S101a, S101b and S101c, it is necessary to perform S101b first and then perform S101c, so that the second liquid crystal layer is first under the action of the weaker electric field, and then under the action of the stronger electric field. In this way, the second liquid crystal layer may be converted from the first steady state to the second steady state (the scattering state) due to the action of the weaker electric field, and then converted from the second steady state to the state where the optical axes of the second liquid crystal molecules are perpendicular to the first polarizer due to the action of the stronger electric field.

S102 may include the following steps.

In step 102a (S102a), the liquid crystal display panel is driven to convert from displaying the black picture to displaying the non-black picture.

In some possible implementation manners, considering an example in which the liquid crystal display panel adopts the ADS mode, driving the liquid crystal display panel to display the non-black picture may include: controlling the voltage difference between the first control electrode and the third control electrode (i.e. the pixel electrode and the common electrode), so that at least one pixel in the liquid crystal display panel displays the non-black block. For example, the pixel electrode and the common electrode of at least one sub-pixel (e.g. one sub-pixel or three sub-pixels) are set to be at unequal voltages, and thus the pixel electrode and the common electrode may generate the horizontal electric field in the first liquid crystal layer corresponding to the sub-pixel, so that the first liquid crystal molecules therein are deflected, thereby enabling the pixel to display the non-black block.

In step 102b (S102b), the first vertical electric field is withdrawn, so that the second liquid crystal layer is in the first steady state.

Since the first vertical electric field is withdrawn, the electric field in the second liquid crystal layer rapidly changes from the first vertical electric field to zero field. In this way, the second liquid crystal layer may be converted from a state in which the optical axes of the second liquid crystal molecules are perpendicular to the first polarizer to a state in which the orthogonal projections of the optical axes of the second liquid crystal molecules on the first polarizer are parallel to the orthogonal projection of the optical axis of the optical compensation layer on the first polarizer, so that the second liquid crystal layer may achieve the compensation of the transmittance of the liquid crystal display panel in a case where the liquid crystal display panel displays the non-black picture.

In some possible implementation manners, withdrawing the first vertical electric field may include: de-energizing the second control electrode, so that the first vertical electric field is withdrawn; alternatively, setting the second control electrode and the first control electrodes to be at the equal voltage, so that the first vertical electric field is withdrawn.

An order of S102a and S102b is not limited. For example, S102a may be performed first, and S102b may be performed later; alternatively, S102b may be performed first, and S102a may be performed later. For another example, S102a and S102b may be performed simultaneously.

The embodiments of the present disclosure further provide a driving method for a liquid crystal display panel, the liquid crystal display panel may be the liquid crystal display panel including the second liquid crystal layer provided in the above embodiments. That is, the driving method for the liquid crystal display panel provided in the embodiments of the present disclosure may be used for driving the liquid crystal display panel including the second liquid crystal layer.

Referring to FIG. 13, the driving method for the liquid crystal display panel includes the following steps. In step 201 (S201), a pixel in the liquid crystal display panel is driven to display a black block, and the first vertical electric field is applied to a portion of the second liquid crystal layer corresponding to the pixel through the first control electrode and the second control electrode, so as to drive the optical axes of the second liquid crystal molecules in the portion to be perpendicular to the first polarizer.

In some possible implementation manners, considering an example in which the liquid crystal display panel is the ADS mode, the liquid crystal display panel may include at least one pixel, and one pixel may include sub-pixels. For example, one pixel may include sub-pixels of three primary color, such as a red sub-pixel, a green sub-pixel, and a blue sub-pixel. The liquid crystal display panel may further include pixel electrodes and common electrodes of the plurality of sub-pixels, one sub-pixel may correspond to a pixel electrode and a common electrode, and then one pixel may correspond to a plurality of (e.g. three) pixel electrodes and a plurality of (e.g. three) common electrodes. Driving the pixel in the liquid crystal display panel to display the black block may include: controlling the voltage difference between the pixel electrode and the common electrode in each sub-pixel corresponding to the pixel, for example, setting the pixel electrode and the common electrode of each sub-pixel to be at an equal voltage, so as to drive the first liquid crystal molecules corresponding to each sub-pixel in the pixel not to be deflected, so that the pixel displays the black block.

In some possible implementation manners, referring to FIG. 8E, one pixel may correspond to three sub-pixels, one sub-pixel may correspond to a first control electrode 30 and a third control electrode 40, and three sub-pixels in a pixel may collectively correspond to a second control electrode 50. Based on this, applying the first vertical electric field to the portion of the second liquid crystal layer corresponding to the pixel through the first control electrode 30 and the second control electrode 50 may include: setting the second control electrode 50 and each of the three first control electrodes 30 that are corresponding to the pixel to be at unequal voltages. For example, the three first control electrodes 30 may be set to be at an equal voltage, and the second control electrode 50 may be set to be at a voltage unequal to the three first control electrodes 30. In this way, the first vertical electric field may be generated between a portion of each first control electrode 30 directly opposite to the second control electrode 50 and the second control electrode 50, and the optical axes of the second liquid crystal molecules in the first vertical electric field are deflected through the first vertical electric field, so that the optical axes of the second liquid crystal molecules are perpendicular to the first polarizer.

In step 202 (S202), the pixel in the liquid crystal display panel is driven to display a non-black block, and the first vertical electric field is withdrawn, so that the orthogonal projections of optical axes of the second liquid crystal molecules in the portion of the second liquid crystal layer corresponding to the pixel on the first polarizer are parallel to the orthogonal projection of the optical axis of the optical compensation layer on the first polarizer.

In some possible implementation manners, considering an example in which the liquid crystal display panel adopts the ADS mode, the liquid crystal display panel may include pixel electrodes and common electrodes of the plurality of sub-pixels, the common electrodes of the sub-pixels are coupled to each other, and may be applied with the same voltage Vcom. Driving the pixel in the liquid crystal display panel to display the non-black picture may include: controlling the voltage difference between the pixel electrode and the common electrode in each sub-pixel to make at least one pixel in the liquid crystal display panel display the non-black block. For example, the pixel electrode and the common electrode that are corresponding to at least one sub-pixel (e.g. one sub-pixel or three sub-pixels) in the pixels displaying the non-black blocks are set to be at unequal voltages, and then the pixel electrode and the common electrode may generate the horizontal electric field in the first liquid crystal layer corresponding to the sub-pixel, so that the first liquid crystal molecules therein are deflected, and then the pixel may display the non-black block.

In some possible implementation manners, withdrawing the first vertical electric field may include: de-energizing the first control electrode and/or the second control electrode, so that the first vertical electric field is withdrawn; alternatively, setting the first control electrode and the second control electrode to be at an equal voltage, so that the first vertical electric field is withdrawn. For example, referring to FIG. 8E, one pixel may correspond to three sub-pixels, one sub-pixel may correspond to a first control electrode 30 and a third control electrode 40, and three sub-pixels in one pixel may collectively correspond to a second control electrode 50. Since the first control electrode 30 also needs to act as the pixel electrode or the common electrode to generate the horizontal electric field, withdrawing the first vertical electric field may include: de-energizing the second control electrode 50 to withdraw the first vertical electric field; alternatively, setting the second control electrode 50 and the first control electrode 30 to be at an equal voltage, so that the first vertical electric field is withdrawn.

In the driving method for the liquid crystal display panel provided by the embodiments of the present disclosure, an order of S201 and S202 is not limited. For example, S201 may be performed first, and then S202 may be performed; alternatively, S202 may be performed first, and then S202 may be performed. For another example, only S201 may be performed and S202 is not performed; alternatively, only S202 may be performed and S201 is not performed.

In a case where the liquid crystal display panel includes the plurality of pixels, through the above driving method for the liquid crystal display panel, each pixel in the liquid crystal display panel may be individually controlled when the liquid crystal display panel displays the non-black picture. For example, the orthogonal projections of optical axes of second liquid crystal molecules in the second liquid crystal layer corresponding to the pixels displaying the non-black blocks in the liquid crystal display panel on the first polarizer is controlled to be parallel to the orthogonal projection of the optical axes of the optical compensation layer on the first polarizer, so that the second liquid crystal layer and the optical compensation layer may achieve the compensation of the transmittance on the portion of the liquid crystal display panel corresponding to the pixels displaying the non-black blocks. The optical axes of the second liquid crystal molecules in the second liquid crystal layer corresponding to the pixels displaying the black blocks in the liquid crystal display panel are controlled to be perpendicular to the first polarizer, so that the second liquid crystal layer and the optical compensation layer may perform light leakage compensation on the portion of the liquid crystal display panel corresponding to the pixels displaying the black blocks in the dark state. In this way, the display effect of the liquid crystal display panel for displaying the non-black picture may be further improved.

In some embodiments, the second liquid crystal layer is the polymer dispersed bistable nematic liquid crystal layer. The liquid crystal display panel includes the plurality of first control electrodes. The liquid crystal display panel may further include the third control electrode(s), and the first control electrodes and the third control electrode(s) are disposed between the first liquid crystal layer and the first polarizer. Each first control electrode may be the pixel electrode or the common electrode of each sub-pixel. The second control electrode(s) may be the whole layer of electrode. In this case, S101 may include the following steps.

In step 201a (S201a), the pixel in the liquid crystal display panel is driven to convert from displaying the non-black block to displaying the black block.

In some possible implementation manners, a voltage difference between the first control electrode and the third control electrode (i.e., the pixel electrode and the common electrode) corresponding to each sub-pixel of the pixel in the liquid crystal display panel may be controlled, for example, the pixel electrode and the common electrode of each sub-pixel are set to be at an equal voltage, so that the horizontal electric field cannot be generated between the pixel electrode and the common electrode of each sub-pixel in the pixel, and the first liquid crystal molecules cannot be deflected, thereby making the pixel display the black block.

In step 201b (S201b), the second vertical electric field is applied to the portion of the second liquid crystal layer corresponding to the pixel through the first control electrodes and the second control electrode, and the electric field intensity of the second vertical electric field is less than the electric field intensity of the first vertical electric field.

Due to the action of the weaker electric field, the corresponding portion of the second liquid crystal layer is in the second stable state. In a case where the corresponding portion of the second liquid crystal layer is in the second stable state, the directors of the liquid crystal droplets in the portion may be arbitrary, so that the corresponding portion of the second liquid crystal layer in the second steady state is in the scattering state.

In some possible implementation manners, referring to FIG. 8E, one pixel may correspond to three sub-pixels, one sub-pixel may correspond to a first control electrode 30 and a third control electrode 40, and three sub-pixels in a pixel may collectively correspond to a second control electrode 50. Based on this, applying the second vertical electric field to the portion of the second liquid crystal layer corresponding to the pixel through the first control electrodes 30 and the second control electrode 50 may include: setting the second control electrode 50 and each of the three first control electrodes 30 that are corresponding to the pixel to be at unequal voltages. For example, the three first control electrodes 30 may be set to be at an equal voltage, and the second control electrode 50 may be set to be at an unequal voltage. In this way, the second vertical electric field may be generated between a portion of each first control electrode 30 directly opposite to the second control electrode 50 and the second control electrode 50.

In step 201c (S201c), further, the first vertical electric field is applied to the portion of the second liquid crystal layer corresponding to the pixel through the first control electrodes and the second control electrode.

Since the electric field intensity of the first vertical electric field is greater than the electric field intensity of the second vertical electric field, due to the action of the stronger electric field, the corresponding portion of the second liquid crystal layer is converted from the second steady state, that is, the scattering state, to the state where the optical axes of the second liquid crystal molecules are perpendicular to the first polarizer.

In the above S201a, S201b and S201c, it is necessary to perform S201b first and then perform S201c, so that the second liquid crystal layer is first under the action of the weaker electric field, and then under the action of the stronger electric field. In this way, the second liquid crystal layer may be converted from the first steady state to the second steady state (the scattering state) due to the action of the weaker electric field, and then converted from the second steady state to the state where the optical axes of the second liquid crystal molecules are perpendicular to the first polarizer due to the action of the stronger electric field.

S202 may include the following steps.

In step 202a (S202a), the pixel in the liquid crystal display panel is driven to convert from displaying the black block to displaying the non-black block.

In some possible implementation manners, considering an example in which the liquid crystal display panel adopts the ADS mode, the liquid crystal display panel may include pixel electrodes and common electrodes of the plurality of sub-pixels. Driving the pixel in the liquid crystal display panel to convert from displaying the black block to displaying the non-black block may include: controlling the voltage difference between the pixel electrode and the common electrode in each sub-pixel to make the pixel display the non-black block. For example, the pixel electrode and the common electrode of at least one sub-pixel (e.g. one sub-pixel or three sub-pixels) in the pixel displaying the non-black block are set to be at unequal voltages, and thus the pixel electrode and the common electrode may generate the horizontal electric field in the first liquid crystal layer corresponding to the sub-pixel, so that the first liquid crystal molecules are deflected, thereby enabling the pixel to display the non-black block.

In step 202b (S202b), the first vertical electric field is withdrawn, so that the portion of the second liquid crystal layer corresponding to the pixel is in the first steady state.

Since the first vertical electric field is withdrawn, the electric field in the portion of the second liquid crystal layer corresponding to the pixel rapidly changes from the first vertical electric field to zero field. In this way, the portion of the second liquid crystal layer corresponding to the pixel may be converted from the state where the optical axes of the second liquid crystal molecules are perpendicular to the first polarizer to the state where the orthogonal projections of the optical axes of the second liquid crystal molecules on the first polarizer are parallel to the orthogonal projection of the optical axis of the optical compensation layer on the first polarizer. As a result, the portion of the second liquid crystal layer corresponding to the pixel may achieve the compensation of the transmittance of the liquid crystal display panel in a case where the pixel displays the non-black block.

In some possible implementation manners, withdrawing the first vertical electric field may include: de-energizing the second control electrode, so that the first vertical electric field is withdrawn; alternatively, setting the second control electrode and the first control electrodes to be at an equal voltage, so that the first vertical electric field is withdrawn.

An order of S202a and S202b is not limited. For example, S202a may be performed first and then S202b may be performed; alternatively, 3202b may be performed first, and then S202a may be performed. For another example, S202a and S202b may be performed simultaneously.

The foregoing descriptions are merely specific embodiments of the present disclosure, but the protection scope of the present disclosure is not limited thereto. Changes or replacements that any person skilled in the art could conceive of within the technical scope of the present disclosure shall all be included in the protection scope of the present disclosure. Therefore, the protection scope of the present disclosure shall be subject to the protection scope of the claims.

What is claimed is:

1. A liquid crystal display panel, comprising:
   a first polarizer;
   a second polarizer disposed opposite to the first polarizer, a transmission axis of the first polarizer being perpendicular to a transmission axis of the second polarizer;
   a first liquid crystal layer disposed between the first polarizer and the second polarizer, wherein the first liquid crystal layer includes first liquid crystal molecules, and an included angle between an orthogonal projection of an optical axis of a first liquid crystal molecule on the first polarizer and the transmission axis of the first polarizer is an acute angle; and an optical compensation layer disposed between the first liquid crystal layer and one of the first polarizer and the second polarizer; wherein an orthogonal projection of an optical axis of the optical compensation layer on the first polarizer is perpendicular to the orthogonal projection of the optical axis of the first liquid crystal molecule on the first polarizer; and an absolute value of a difference between an in-plane retardation of the optical compensation layer and an in-plane retardation of the first liquid crystal layer is less than or equal to 30 nm.

2. The liquid crystal display panel according to claim 1, wherein the in-plane retardation of the first liquid crystal layer is in a range of 87 nm to 263 nm, inclusive.

3. The liquid crystal display panel according to claim 1, wherein
the in-plane retardation of the optical compensation layer is equal to the in-plane retardation of the first liquid crystal layer.

4. The liquid crystal display panel according to claim 1, wherein the optical compensation layer is a +A compensation layer.

5. The liquid crystal display panel according to claim 1, wherein
the included angle between the orthogonal projection of the optical axis of the first liquid crystal molecule on the first polarizer and the transmission axis of the first polarizer is in a range of 15° to 40°, inclusive, or in a range of 50° to 75°, inclusive.

6. The liquid crystal display panel according to claim 5, wherein
the included angle between the orthogonal projection of the optical axis of the first liquid crystal molecule on the first polarizer and the transmission axis of the first polarizer is in a range of a difference between 30° and 10° to a sum of 30° and 10°, inclusive, or in a range of a difference between 60° and 10° to a sum of 60° and 10°, inclusive; or the included angle between the orthogonal projection of the optical axis of the first liquid crystal molecule on the first polarizer and the transmission axis of the first polarizer is in a range of a difference between 25° and 10° to a sum of 25° and 10°, inclusive, or in a range of a difference between 65° and 10° to a sum of 65° and 10°, inclusive.

7. The liquid crystal display panel according to claim 1, further comprising:
a base substrate, and a color filter layer disposed between the base substrate and the first liquid crystal layer, wherein the optical compensation layer is disposed between the color filter layer and the first liquid crystal layer; or a base substrate, and a color filter layer disposed between the base substrate and the first liquid crystal layer, wherein the optical compensation layer is disposed between the color filter layer and the first liquid crystal layer, and the optical compensation layer is a planarization layer.

8. The liquid crystal display panel according to claim 1, further comprising:
a first alignment film and a second alignment film that are disposed oppositely, wherein
the first alignment film is disposed on a side of the first liquid crystal layer proximate to the first polarizer, and the first alignment film is in contact with the first liquid crystal layer;
the second alignment film is disposed on a side of the first liquid crystal layer proximate to the second polarizer, and the second alignment film is in contact with the first liquid crystal layer; and
an alignment direction of the first alignment film is the same as an alignment direction of the second alignment film.

9. The liquid crystal display panel according to claim 1, wherein,
the first liquid crystal molecules are negative liquid crystal molecules.

10. The liquid crystal display panel according to claim 1, further comprising:
a second liquid crystal layer disposed between the first polarizer and the first liquid crystal layer or between the second polarizer and the first liquid crystal layer, the second liquid crystal layer including second liquid crystal molecules; and
at least one first control electrode and at least one second control electrode, wherein the at least one first control electrode is disposed between the first polarizer and the second liquid crystal layer, the at least one second control electrode is disposed between the second polarizer and the second liquid crystal layer, and an orthogonal projection of the at least one first control electrode on the first polarizer and an orthogonal projection of a second control electrode on the first polarizer have an overlapping region.

11. The liquid crystal display panel according to claim 10, wherein
the second liquid crystal layer is a polymer dispersed bistable nematic liquid crystal layer having a first stable state and a second stable state, wherein
in a case where the second liquid crystal layer is in the first stable state, an orthogonal projection of an optical axis of a second liquid crystal molecule on the first polarizer is parallel to the orthogonal projection of the optical axis of the optical compensation layer on the first polarizer; and in a case where the second liquid crystal layer is in the second steady state, the second liquid crystal layer is in a scattering state.

12. The liquid crystal display panel of claim 11, wherein the second liquid crystal layer is disposed between the first liquid crystal layer and the second polarizer;
the liquid crystal display panel further comprises at least one third control electrode, and the at least one third control electrode and the at least one first control electrode are disposed between the first liquid crystal layer and the first polarizer; one of the at least one third control electrode and the at least one first control electrode is a pixel electrode, and another thereof is a common electrode.

13. The liquid crystal display panel according to claim 10, wherein
in a case where the liquid crystal display panel displays a non-black picture, an orthogonal projection of an optical axis of a second liquid crystal molecule on the first polarizer is parallel to the orthogonal projection of the optical axis of the optical compensation layer on the first polarizer, and an in-plane retardation of the second liquid crystal layer is in a range of 120 nm to 280 nm, inclusive.

14. The liquid crystal display panel according to claim 13, wherein
the in-plane retardation of the second liquid crystal layer is in a range of a difference between 247 nm and 20 nm to a sum of 247 nm and 20 nm, inclusive.

15. The liquid crystal display panel according to claim 10, wherein
the optical compensation layer is located between the first liquid crystal layer and the second liquid crystal layer.

16. A display apparatus comprising the liquid crystal display panel according to claim 1.

17. A driving method for a liquid crystal display panel, the liquid crystal display panel is the liquid crystal display panel according to claim 10;
the driving method for the liquid crystal display panel comprising:
driving the liquid crystal display panel to display a black picture, and applying a first vertical electric field to the second liquid crystal layer through the at least one first control electrode and the at least one second control electrode, so as to drive optical axes of the second liquid crystal molecules in the second liquid crystal layer to be perpendicular to the first polarizer;
driving the liquid crystal display panel to display a non-black picture, and withdrawing the first vertical electric field, so that orthogonal projections of the optical axes of the second liquid crystal molecules in the second liquid crystal layer on the first polarizer are parallel to the orthogonal projection of the optical axis of the optical compensation layer on the first polarizer.

18. The driving method for the liquid crystal display panel according to claim 17, wherein the second liquid crystal layer is a polymer dispersed bistable nematic liquid crystal layer;
driving the liquid crystal display panel to display the black picture, and applying the first vertical electric field to the second liquid crystal layer through the at least one first control electrode and the at least one second control electrode, so as to drive the optical axes of the second liquid crystal molecules in the second liquid crystal layer to be perpendicular to the first polarizer, includes:
driving the liquid crystal display panel to convert from displaying the non-black picture to displaying the black picture;
applying a second vertical electric field to the second liquid crystal layer through the at least one first control electrode and the at least one second control electrode, so that the second liquid crystal layer is in a second stable state; and
applying the first vertical electric field to the second liquid crystal layer through the first control electrode and the second control electrode, so that the optical axes of the second liquid crystal molecules are perpendicular to the first polarizer; and
driving the liquid crystal display panel to display the non-black picture, and withdrawing the first vertical electric field, so that the orthogonal projections of the optical axes of the second liquid crystal molecules in the second liquid crystal layer on the first polarizer are parallel to the orthogonal projection of the optical axis of the optical compensation layer on the first polarizer, includes:
driving the liquid crystal display panel to convert from displaying the black picture to displaying the non-black picture; and
withdrawing the first vertical electric field, so that the second liquid crystal layer is in a first steady state;
wherein an electric field intensity of the first vertical electric field is greater than an electric field intensity of the second vertical electric field.

19. A driving method for a liquid crystal display panel, the liquid crystal display panel is the liquid crystal display panel according to claim 10;
the driving method for the liquid crystal display panel comprising:
driving a pixel in the liquid crystal display panel to display a black block, and applying a first vertical electric field to a portion of the second liquid crystal layer corresponding to the pixel through the at least one first control electrode and the at least one second control electrode, so as to drive optical axes of the second liquid crystal molecules in the portion of the second liquid crystal layer to be perpendicular to the first polarizer; and
driving the pixel in the liquid crystal display panel to display a non-black block, and withdrawing the first vertical electric field, so that orthogonal projections of the optical axes of the second liquid crystal molecules in the portion of the second liquid crystal layer corresponding to the pixel on the first polarizer are parallel to the orthogonal projection of the optical axis of the optical compensation layer on the first polarizer.

* * * * *